United States Patent [19]
Onosaka et al.

[11] Patent Number: 5,842,306
[45] Date of Patent: Dec. 1, 1998

[54] TRANSPLANTER

[75] Inventors: Takashi Onosaka; Kenji Okuno, both of Amagasaki; Kiyoshi Uchida, Osaka; Setsuo Buno, Osaka; Hisaya Yamada, Osaka, all of Japan

[73] Assignees: Yanmar Agricultural Equipment Co., Ltd., Osaka-Fu; Kanzaki Kokyukoki Mfg. Co., Ltd., Hyogo-Ken, both of Japan

[21] Appl. No.: 559,372

[22] Filed: Nov. 16, 1995

[30] Foreign Application Priority Data

Nov. 17, 1994 [JP] Japan ................................. 6-283746
Feb. 3, 1995 [JP] Japan ................................. 7-017211

[51] Int. Cl.$^6$ ............................. A01C 11/02; B65G 47/90
[52] U.S. Cl. .......................................................... 47/1.01
[58] Field of Search ............................. 47/65, 1.01, 1 A, 47/901

[56] References Cited

U.S. PATENT DOCUMENTS

| | | | |
|---|---|---|---|
| 4,317,308 | 3/1982 | Derrick | 47/65 D |
| 4,408,549 | 10/1983 | Qvarnstrom . | |
| 4,481,893 | 11/1984 | Qvarnstrom . | |
| 4,947,579 | 8/1990 | Harrison . | |
| 4,970,824 | 11/1990 | Visser . | |
| 4,998,945 | 3/1991 | Holt . | |
| 5,121,955 | 6/1992 | Visser . | |
| 5,247,761 | 9/1993 | Miles . | |
| 5,365,693 | 11/1994 | Van Wingerden | 47/1 A |

FOREIGN PATENT DOCUMENTS

| | | |
|---|---|---|
| A-396208 | 11/1990 | European Pat. Off. . |
| 551232A1 | 7/1993 | European Pat. Off. . |
| A-551232 | 7/1993 | European Pat. Off. . |
| A-2635637 | 3/1990 | France . |
| A-2693344 | 1/1994 | France . |
| A-2078480 | 1/1982 | United Kingdom . |
| 2186776 | 8/1987 | United Kingdom . |
| 2228911 | 9/1990 | United Kingdom . |
| 2259232 | 3/1993 | United Kingdom . |
| WO-A-9319581 | 10/1993 | WIPO . |

*Primary Examiner*—Terry Lee Melius
*Assistant Examiner*—Joanne C. Downs
*Attorney, Agent, or Firm*—Brinks Hofer Gilson & Lione

[57] ABSTRACT

A transplanter(10) for transplanting a plug seedling(G) grown in each cell(14a) of a plug seedling tray(14) to a certain size to a transplanted seedling tray(15) or a pot comprising a plug seedling carrying means(12) for carrying the plug seedling tray(14), a transplanted seedling carrying means(13) spaced at a certain distance from the plug seedling carrying means(12) for carrying the transplanted seedling tray(15) or the pot, a seedling transfer mechanism(30) disposed across the plug seedling carrying means(12) and the transplanted seedling carrying means(13) for transferring the plug seedling from the position above the plug seedling tray(14) to the position above the transplanted seedling tray(15), the seedling transfer mechanism(30) including an endless chain or belt(35) passing above the plug seedling carrying means(12) and the transplanted seedling carrying means(13) and circulating in a plane made at a certain angle with respect to a horizontal plane, the endless chain or belt(35) being provided at its outer peripheral surface with receptacles(36) for containing plug seedlings (G) to be spaced at a predetermined distance with respect to each other, a seedling picking-out mechanism(50) for picking out the plug seedling(G) from the cell(14a) of the plug seedling tray(14) and introducing it into one of the receptacles(36) of the seedling transfer mechanism(30), and a seedling planting mechanism(90) for picking out the plug seedling(G) from the receptacle(36) and planting it in the cell(15a) of the transplanted seedling tray(15) or the pot. The thus constituted transplanter becomes compact, and the transplanting operation can be carried out rapidly.

20 Claims, 28 Drawing Sheets

FIG.9A
FIG.9B
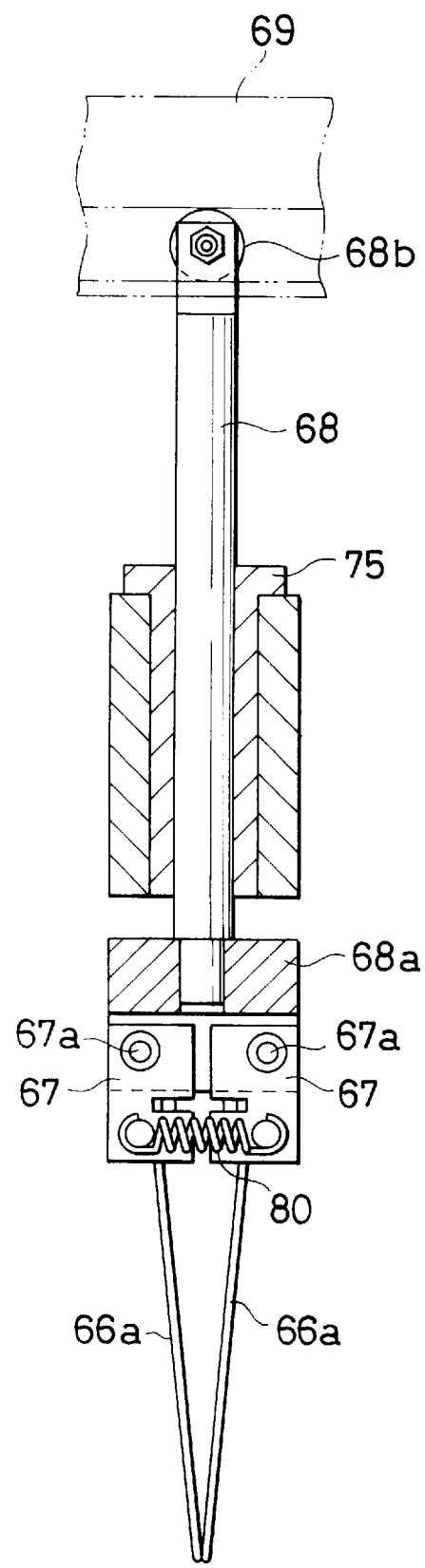
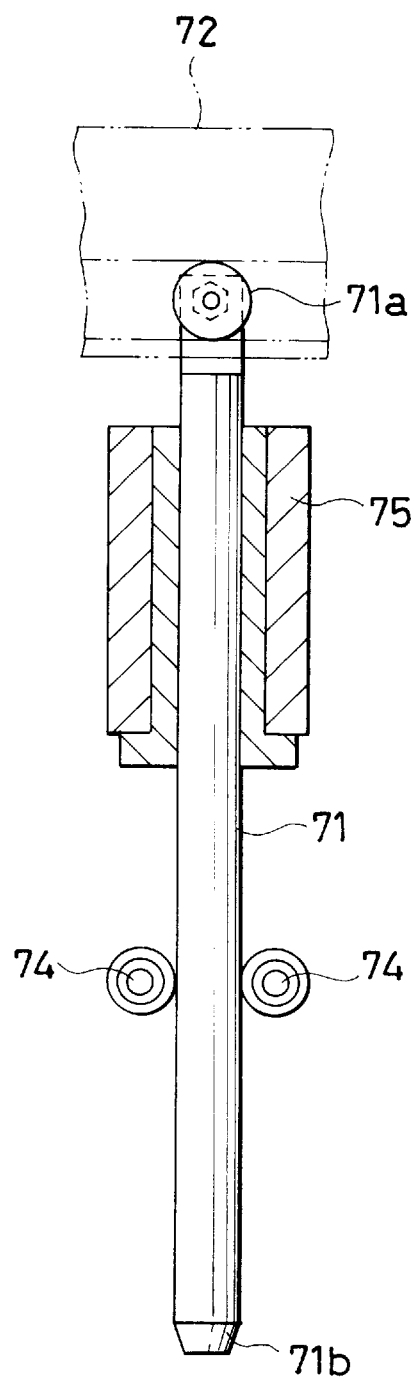

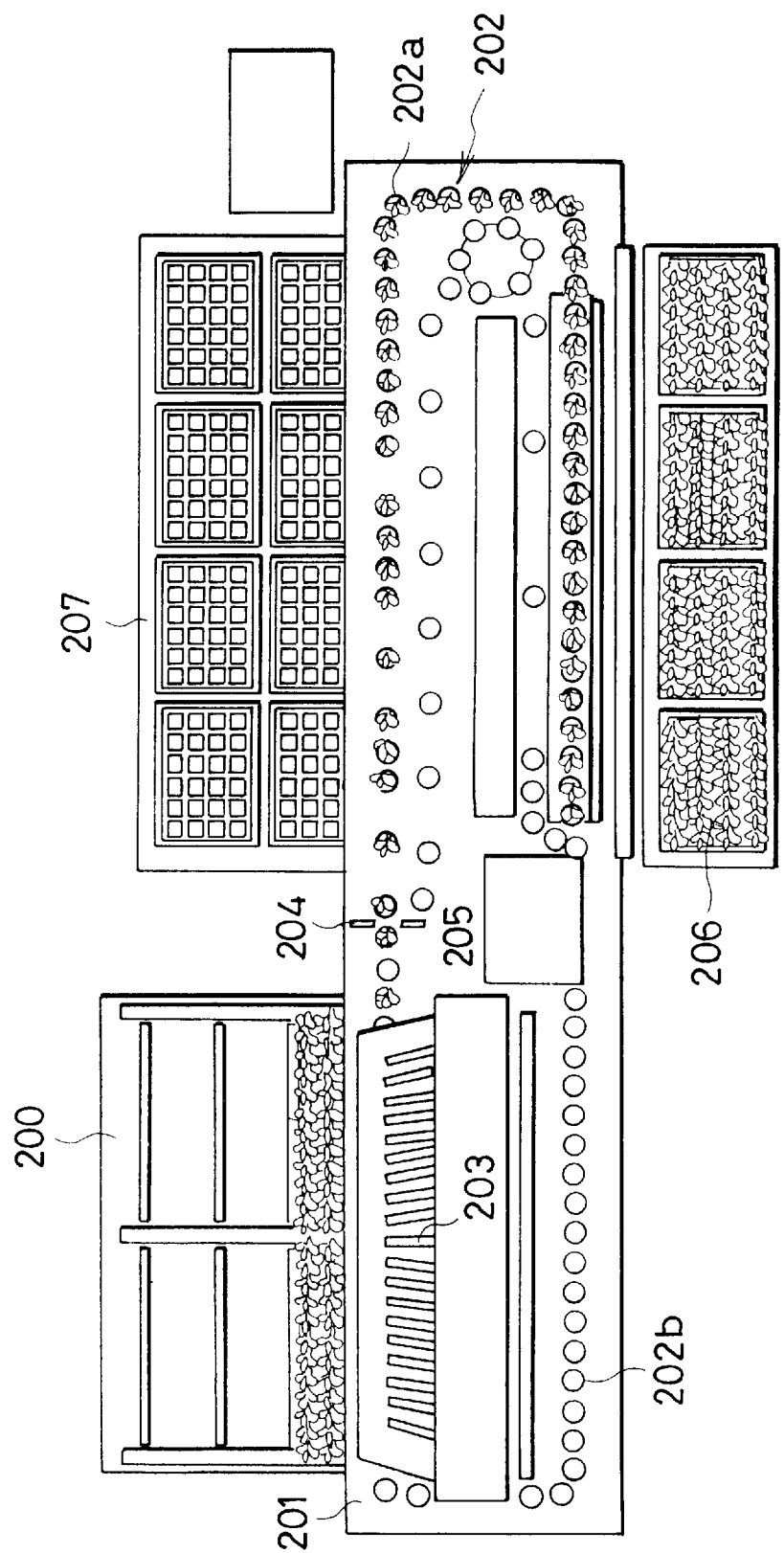

TRANSPLANTER

BACKGROUND OF THE INVENTION

The present invention relates to a transplanter wherein a plug seedling grown in each cell of a plug seedling tray is transplanted from the plug seedling tray to a transplanted seedling tray or a pot.

DESCRIPTION OF THE PRIOR ART

The transplanter for transplanting the plug seedling grown in each cell of the plug seedling tray to a larger tray is known in the field of the agricultural machinery. For example, as shown in FIG. 34, as an example of such a transplanter, it is known that the transplanter including a plug seedling carrying conveyor 200 for carrying the plug seedling tray in which plug seedlings are located, a seedling transfer conveyor 202 ovally disposed on a base, a seedling picking-out mechanism 203 for picking out the plug seedling from the plug seedling tray and introducing it into one of cups of the seedling transfer mechanism, a selection mechanism 204 for selecting the plug seedlings contained in the cups of the seedling transfer conveyor to remove too small seedlings, a conveyor 205 located at the inside of the seedling transfer conveyor 202 for carrying an array of cups in which such too small seedling selected by the selection mechanism are contained, a seedling planting mechanism(not shown) for picking out the plug seedlings which are contained in the cups of the seedling transfer conveyor 202 and introduce it into a transplanted seedling tray 206, and a transplanted seedling carrying conveyor 207 for carrying the transplanted seedling tray 206.

However, there is a problem that the entire transplanter becomes large, because the prior transplanter includes the oval-shaped conveyor 202 for carrying an array 202a of cups in which normal plug seedlings are contained and an array 202b of empty cups, and the U-shaped conveyor 205 for carrying an array of cups in which the thinned-out plug seedlings are contained. Further, in the case where the entire transplanter becomes large, there is another problem that the seedlings take a long time to be carried, and thus, the time required for the transplanting operation becomes longer.

SUMMARY OF THE INVENTION

It is therefore an object of the present invention to provide a compact transplanter which can effect the transplanting operation rapidly.

The above and other objects of the present invention can be accomplished by a transplanter for transplanting a plug seedling grown in each cell of a plug seedling tray to a certain size to a transplanted seedling tray or a pot comprising a plug seedling carrying means for carrying the plug seedling tray, a transplanted seedling carrying means spaced at a certain distance from the plug seedling carrying means for carrying the transplanted seedling tray or the pot, a seedling transfer mechanism disposed across the plug seedling carrying means and the transplanted seedling carrying means for transferring the plug seedling from the position above the plug seedling tray to the position above the transplanted seedling tray, the seedling transfer mechanism including an endless chain or belt passing above the plug seedling carrying means and the transplanted seedling carrying means and circulating in a plane made at a certain angle with respect to a horizontal plane, the endless chain or belt being provided at its outer peripheral surface with receptacles for containing plug seedlings to be spaced at a predetermined distance with respect to each other, a seedling picking-out mechanism for picking out the plug seedling from the cell of the plug seedling tray and introducing it into one of the receptacles of the seedling transfer mechanism, and a seedling planting mechanism for picking out the plug seedling from the receptacle and planting it in the cell of the transplanted seedling tray or the pot.

Further, the above and other objects of the present invention can be accomplished by a transplanter for transplanting a plug seedling grown in each cell of a plug seedling tray to a certain size to a transplanted seedling tray or a pot comprising a plug seedling carrying means for carrying the plug seedling tray, a transplanted seedling carrying means spaced at a certain distance from the plug seedling carrying means for carrying the transplanted seedling tray or the pot, a seedling transfer mechanism disposed across the plug seedling carrying means and the transplanted seedling carrying means for transferring the plug seedling from the position above the plug seedling tray to the position above the transplanted seedling tray, the seedling transfer mechanism including an endless chain or belt passing above the plug seedling carrying means and the transplanted seedling carrying means and circulating in a plane made at a certain angle with respect to a horizontal plane, the endless chain or belt being provided at its outer peripheral surface with receptacles for containing plug seedlings to be spaced at a predetermined distance with respect to each other, a seedling picking-out mechanism for picking out the plug seedling from the cell of the plug seedling tray and introducing it into one of the receptacles of the seedling transfer mechanism, a sensor mounted between the plug seedling carrying means and the transplanted seedling carrying means for judging whether the plug seedling introduced into the receptacle has a desired size or not, and a seedling planting mechanism for picking out the plug seedling judged by the sensor to have a desired size from the receptacle and planting it in the cell of the transplanted seedling tray or the pot.

Furthermore, the above and other objects of the present invention can be accomplished by a transplanter for transplanting a plug seedling grown in each cell of a plug seedling tray to a certain size to a transplanted seedling tray or a pot comprising a transplanted seedling carrying means for carrying the transplanted seedling tray or the pot, a seedling planting mechanism for planting the plug seedling in the cell of the transplanted seedling tray or the pot, and a holing rod driving mechanism to vertically and horizontally move each holing rod for holing the soil contained in the cell of the transplanted seedling tray or the pot, the holing rod driving mechanism being arranged to move each holing rod in synchronization with the movement of the planting mechanism.

In a preferred aspect of the present invention, the endless chain or belt of the seedling transfer mechanism is intermittently moved at a distance between each receptacle.

In another preferred aspect of the present invention, the receptacle is of two types each having a different size.

In a further preferred aspect of the present invention, a part of the endless chain or belt of the seedling transfer mechanism is passed through a tank for disinfection located at the lower portion of the transplanter.

In a further preferred aspect of the present invention, the seedling transfer mechanism includes a washing station for cleaning the receptacles.

In a further preferred aspect of the present invention, when a seedling picking-out support to vertically and horizontally move each picking-out claw for picking out the plug seedling from the cell is moved above the plug seedling tray, the height of the seedling picking-out support being adjustable to two stages.

In a further preferred aspect of the present invention, each of the picking-out claws includes a pair of claw members which are biased by a spring to be closed and which are opened and closed by a claw opening and closing member adjacent to the claws.

In a further preferred aspect of the present invention, each of the picking-out claws includes means for adjusting the degree of the opening and closing of the claw members.

In a further preferred aspect of the present invention, the transplanted seedling carrying means includes means for adjusting the height of the carrying means.

In a further preferred aspect of the present invention, the transplanter further comprises a seedling holding device for preventing the plug seedling from being pulled out during the pulling-out of the picking-out claws from the plug seedling contained in the receptacle.

In a further preferred aspect of the present invention, the seedling planting mechanism includes planting claws for planting the plug seedlings in the cells of the transplanted seedling tray or the pots, each of the planting claws having four claws members which are opend and closed by pressurized air, each of the planting claws grasping the plug seedling through four slits provided at the receptacle to to be spaced at equal distances.

In a further preferred aspect of the present invention, the transplanter further comprises holing devices mounted adjacent to the planting claws for holing the soil contained in the cell of the transplanted seedling tray.

In a further preferred aspect of the present invention, the endless chain or belt of the seedling transfer mechanism is arranged such that the portion lying above the upper side with respect to the plug seedling carrying means and the transplanted seedling carrying means corresponds to a portion for transferring the plug seedlings and the portion lying below the lower side with respect to these carrying means corresponds to a portion for returning the receptacles.

In a further preferred aspect of the present invention, each of the plug seedlings is picked out at the upstream side of the plug seedling carrying means to the seedling transfer mechanism and planted at the downstream side of the transplanted seedling carrying means to the seedling transfer mechanism.

In a further preferred aspect of the present invention, the space between each picking-out claw provided at the seedling picking-out mechanism is adapted to be automatically adjusted.

In a further preferred aspect of the present invention, the space between each planting claw provided at the seedling planting mechanism is adapted to be automatically adjusted.

In a further preferred aspect of the present invention, the endless chain or belt of the seedling transfer mechanism circulates in a plane substantially perpendicular to a horizontal plane.

In a further preferred aspect of the present invention, the transplanted seedling carrying means is disposed paralell to the plug seedling carrying means and spaced at a certain distance from the plug seedling carrying means, and the seedling transfer mechanism is disposed perpendicular to the plug seedling carrying means and the transplanted seedling carrying means.

In a further preferred aspect of the present invention, the planting mechanism includes planting claws for planting each plug seedling in the transplanted seedling tray or a pot, each planting claw being arranged to be operated independently.

In a further preferred aspect of the present invention, the transplanted seedling carrying means is stopped to move when the soil contained in the cell of the transplanted seedling tray or the pot is holed to plant the plug seedling therein.

BRIEF DESCRIPTION OF THE DRAWINGS

FIGS. 9A and 9B are enlarged views of the seedling picking-out mechanism, and FIG. 9A is a schematic view showing a picking-out claw and FIG. 9B is a schematic view showing a claw opening and closing member.

FIG. 15A is a schematic plan view showing the place at which the sensor is disposed and FIG. 15B is a enlarged cross-sectional view taken from arrows 15B—15B in FIG. 15A.

FIGS. 17(a) shows the condition of just before the plug seedling is grasped by the planting claw, and FIGS. 17(b) shows the condition that the plug seedlings other than too small plug seedling G6 are grasped by the planting claws, and FIGS. 17(c) shows the condition of the moment that the plug seedling G6 is grasped by the planting calw.

FIG. 34 is a shematic plan view showing a prior transplanter.

DESCRIPTION OF THE PREFERRED EMBODIMENTS

Figure 1:
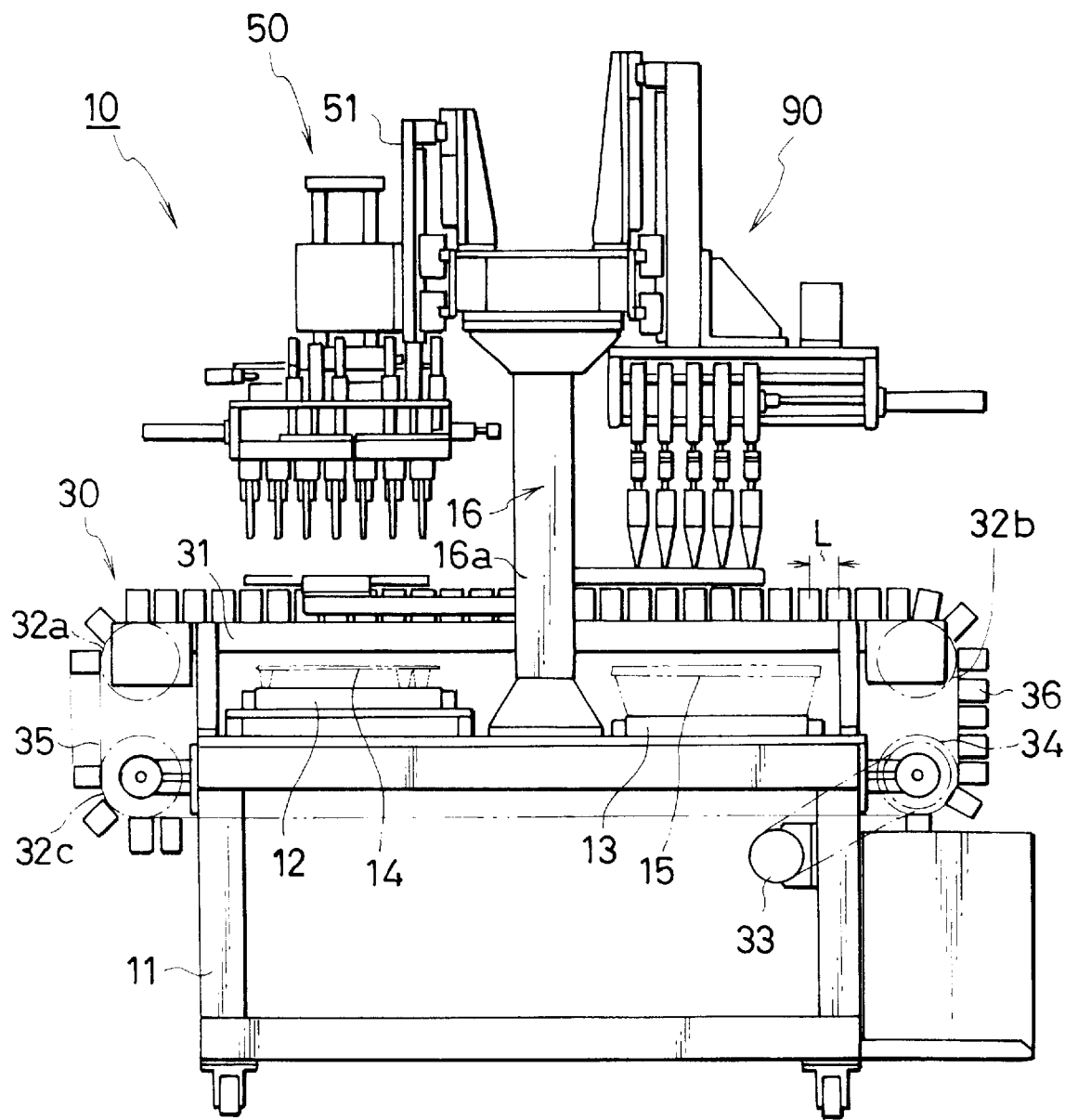
FIG. 1 is a schematic front view of a transplanter which is an embodiment of the present invention.
Figure 2:
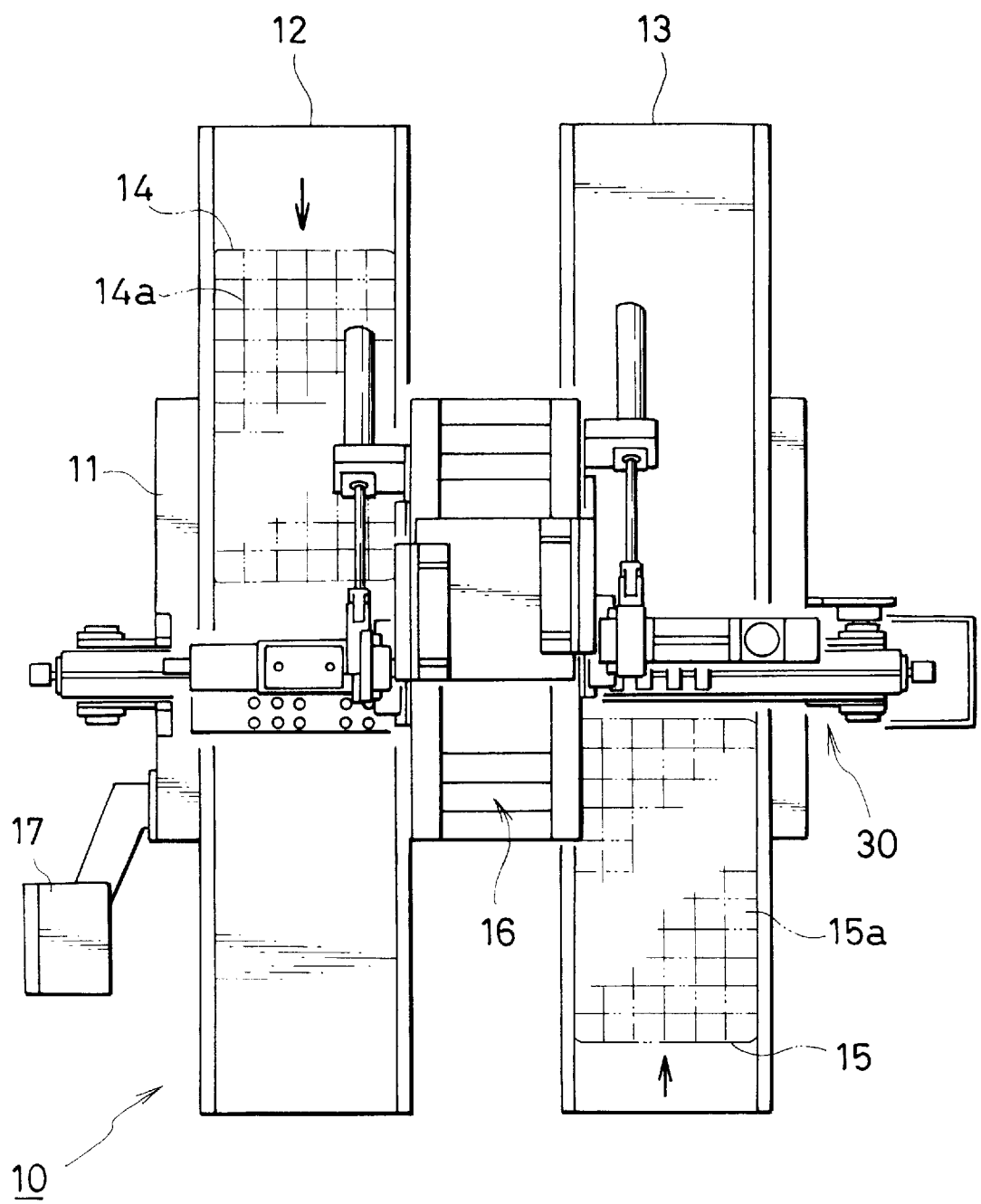
FIG. 2 is a schematic plan view of the transplanter.
Figure 3:
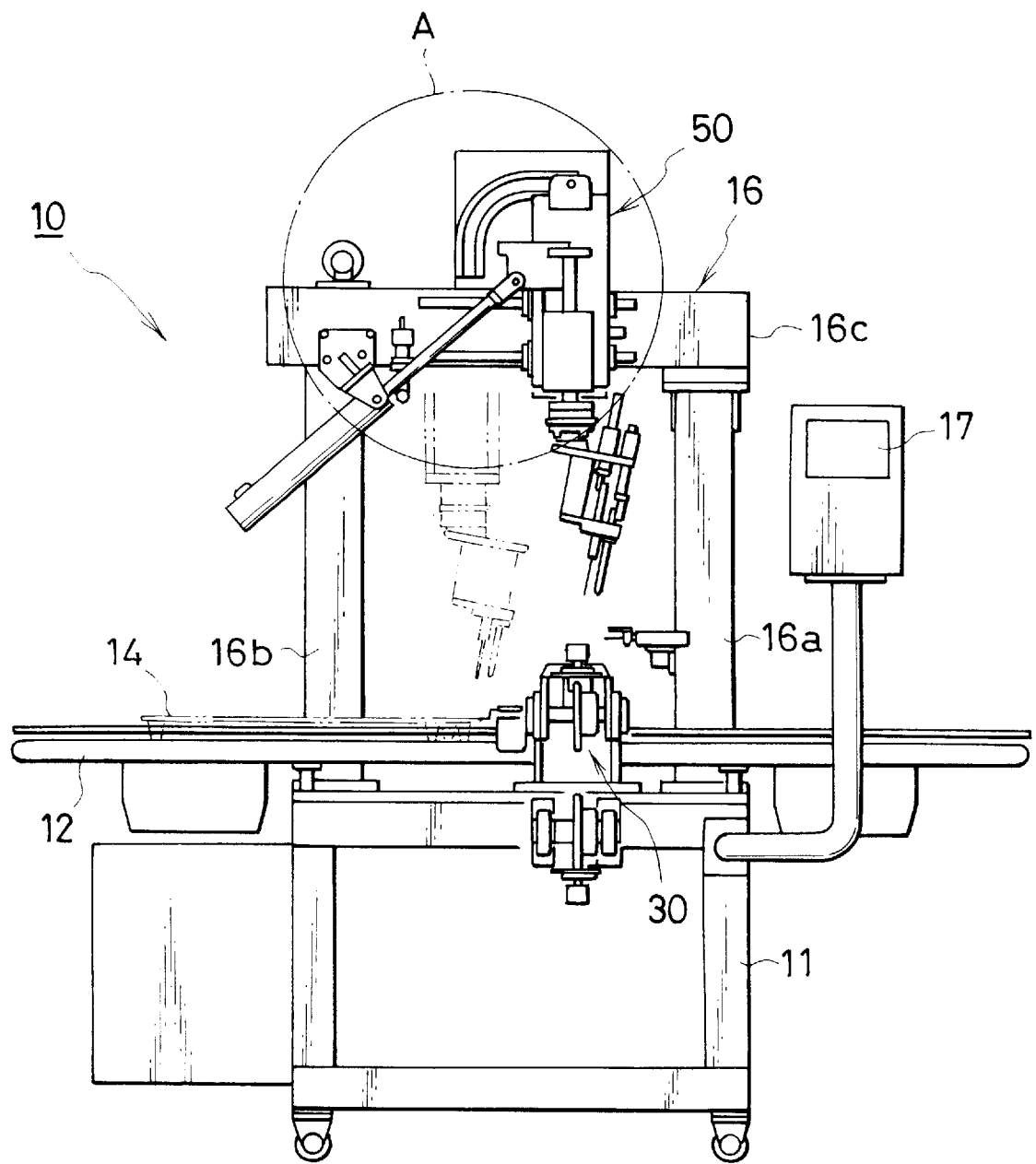
FIG. 3 is a schematic left side view of the transplanter.

As shown in FIGS. 1 to 3, a transplanter generally indicated by a numerical reference 10 which is an embodiment of the present invention includes a base 11 provided at its bottom with casters, a plug seedling carrying means 12 mounted on the base 11, a transplanted seedling carrying means 13 disposed parallel to the plug seedling carrying means 12 and spaced at a certain distance from the plug seedling carrying means 12, a seedling transfer mechanism 30 disposed perpendicular to the plug seedling carrying means 12 and the transplanted seedling carrying means 13 above these means 12 and 13, a seedling picking-out mechanism 50 to effect a seedling picking-out operation, described later, and a seedling planting mechanism 90 to effect a seedling planting operation, described later. Each of the plug seedling carrying means 12 and the transplanted seedling carrying means 13 comprises a known carrying means, such as a belt conveyor, and is moved to the opposite direction, as shown in FIG. 2 by arrows. A plug seedling tray 14 is disposed on the plug seedling carrying means 12, while a transplanted seedling tray 15 is disposed on the transplanted seedling carrying means 13. The plug seedling tray 14 is formed with a multiple of cells 14a into which soil is introduced to plant seed and grow a plug seedling G, which is not shown in FIGS. 1 to 3. Further, the transplanted seedling tray 15 is formed with a multiple of cells 15a into which soil is introduced to plant the plug seedling G grown in the plug seedling tray 14. A frame 16 consisting of columns 16a and 16b and a beam 16c is secured on the base 11. Further, a control panel 17 for controlling a transplanter 10 is provided adjacent to the base 11.

Figure 14:
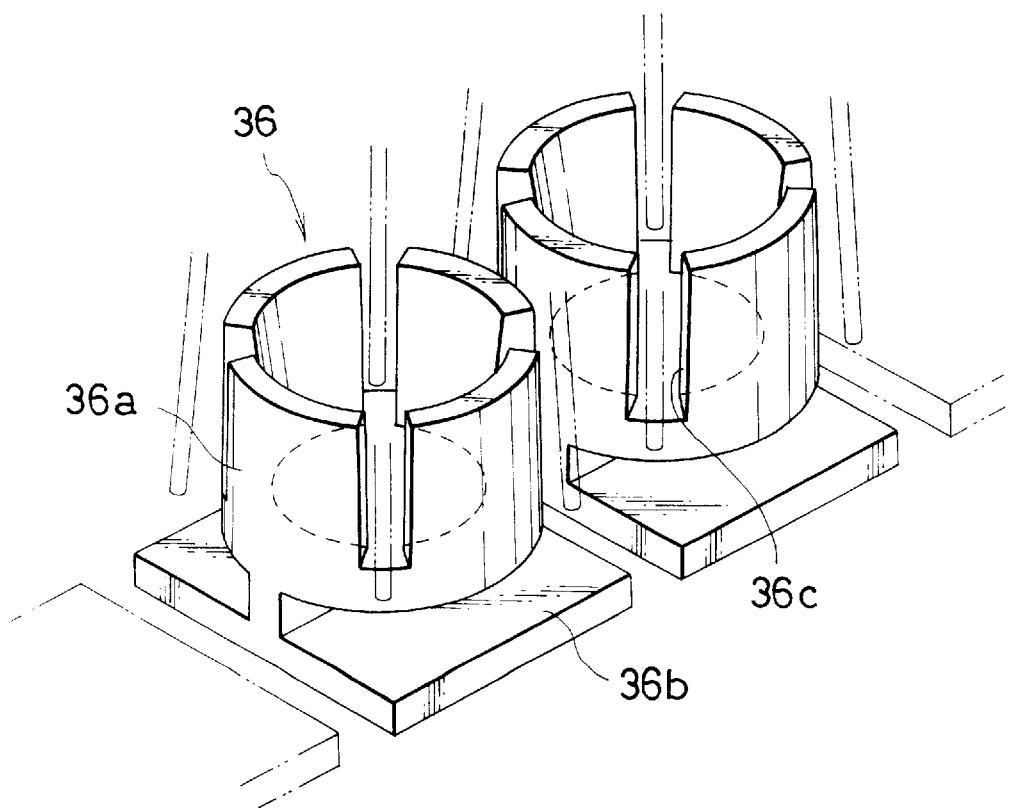
FIG. 14 is an enlarged perspective view showing cups which are mounted on a outer peripheral surface of a chain of a seedling transfer mechanism.

The seedling transfer mechanism 30 for transferring the plug seedling G picked out by the seedling picking-out mechanism 50 to the position above the transplanted seedling carrying means 13 is disposed perpendicular to the plug seedling carrying means 12 and the transplanted seedling carrying means 13. The seedling transfer mechanism 30 includes driven sprockets 32a and 32b each mounted on the both ends of a frame 31 which is fixed on the base 11 to be perpendicular to the plug seedling carrying means 12 and the transplanted seedling carrying means 13, a driven sprocket 32c mounted on one end of the base 11, a driving sprocket 34 mounted on the other end of the base 11 and intermittently driven by a driving means 33, and an endless chain or belt 35 hung about the driven sprockets 32a, 32b, 32c and the driving sprocket 34. A plurality of cups 36 are mounted on the outer peripheral surface of the chain 35 and the space between the adjoining cups 36 is set at a distance L. As shown in FIG. 14 in detail, each cup 36 includes a cup body 36a an internal surface of which has an inverted frustconical shape substantially corresponding to the shape of soil covering the plug seedling G, and a pedestal 36b for mounting the cup body 36a on the outer peripheral surface of the chain 35. Each of the cup body 36a is provided at its portions respectively offset by 45° from the longitudinal axis of the chain 35 with four vertical slits 36c.

According to the above construction, when power is transmitted from the driving means 33 to the driving sprocket 34, the driving sprocket 34 is rotated clockwise in FIG. 1. As a result, the chain 35, thus each cup 36 is intermittently moved clockwise at every distance L.

Figure 4:
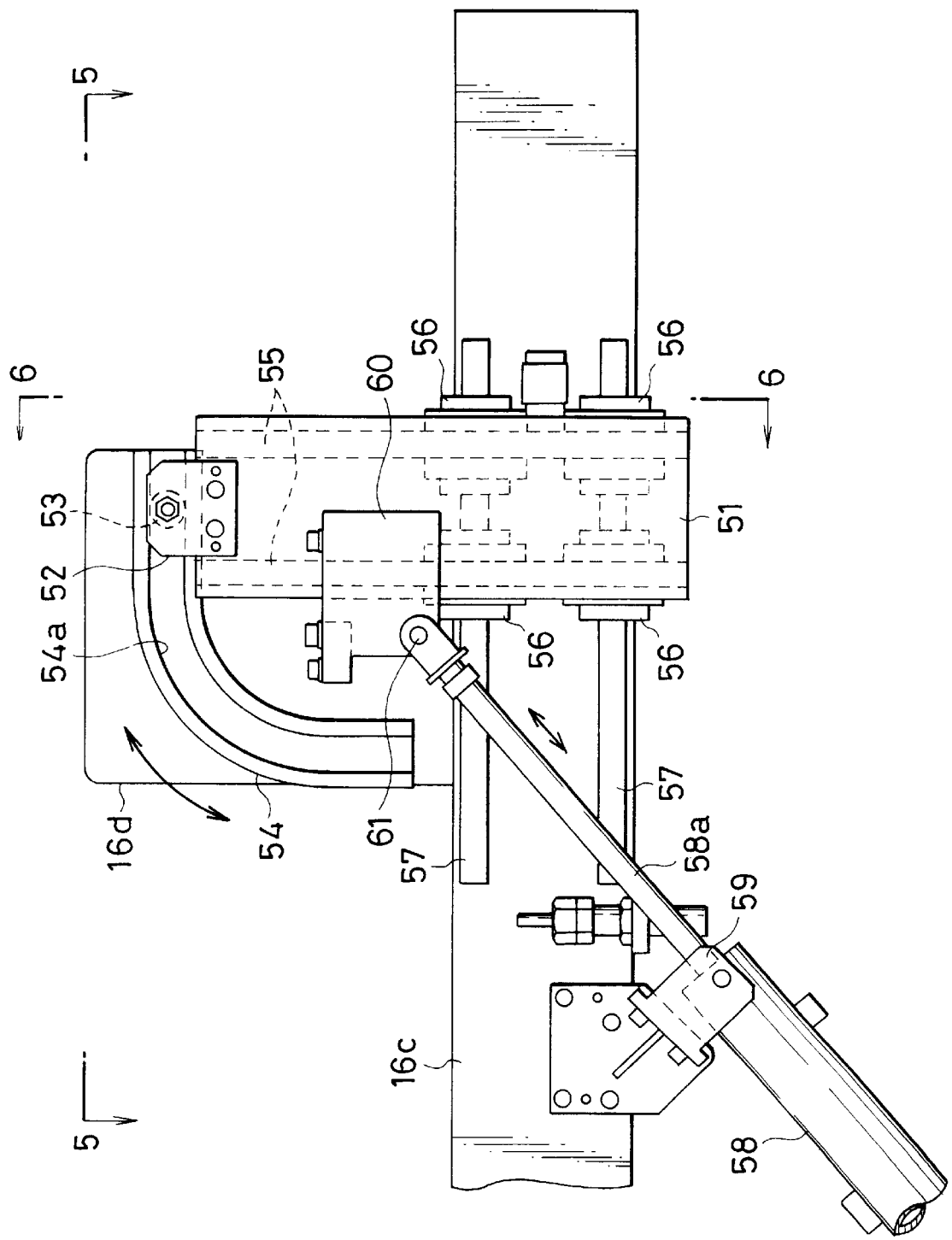
FIG. 4 is a schematic enlarged view of "A" portion in FIG. 3.
Figure 5:
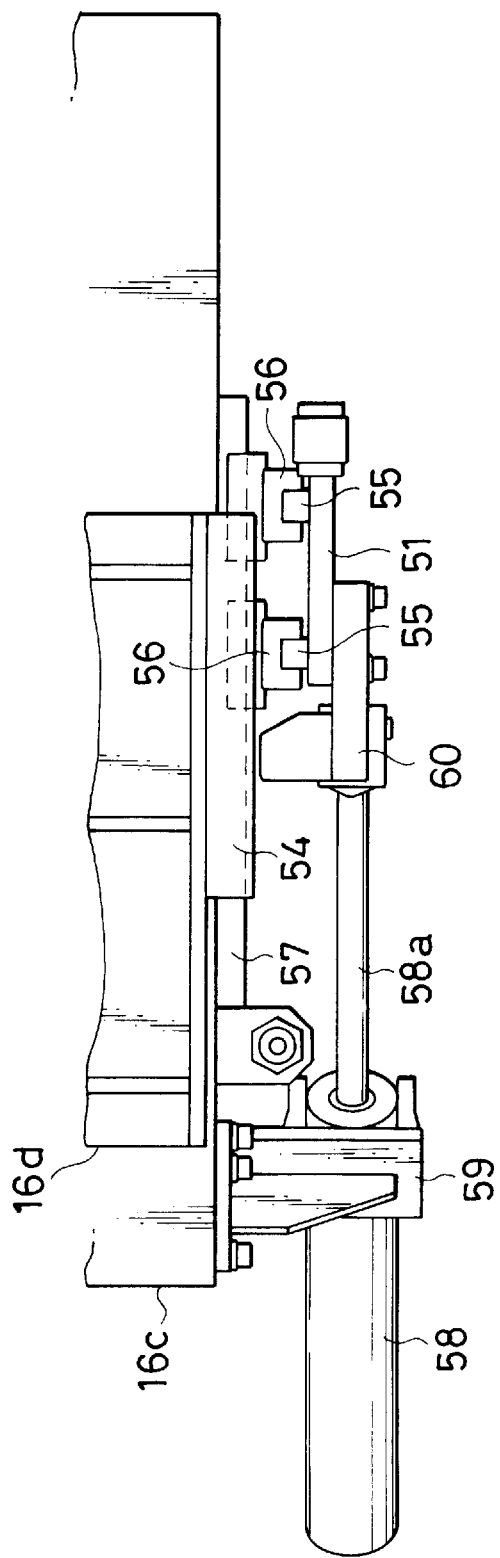
FIG. 5 is a view taken from arrows 5—5 in FIG. 4.
Figure 6:
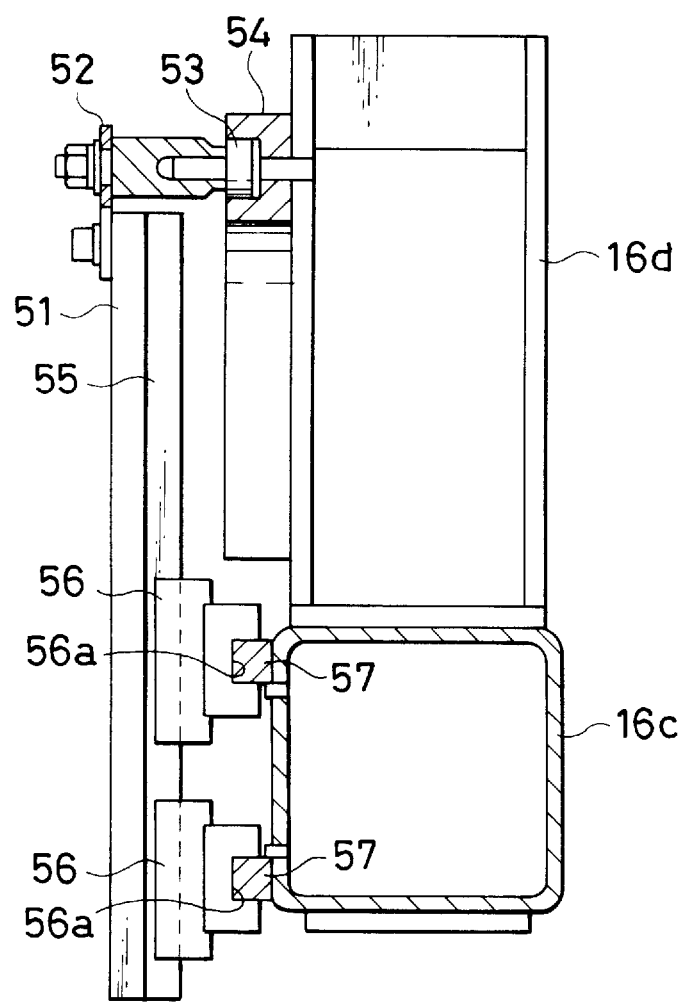
FIG. 6 is a view taken from arrows 6—6 in FIG. 4.

The seedling picking-out mechanism 50 for picking out the plug seedling G from the cell 14a of the plug seedling tray 14 and introducing it into the cup 36 of the seedling transfer machanism 30 includes a seedling picking-out support 51. As shown in FIGS. 4 and 5, a roller 53 is rotatably mounted on a plate 52 provided on the upper portion of the seedling picking-out support 51, and is slidably fitted within a guide portion 54a in an arcuate roller guide 54 which is mounted on the side of a strut 16d fixed to the central portion of the beam 16c of the frame 16. The seedling picking-out support 51 is provided with a pair of vertical guide rails 55, and two sliders 56 are fitted within each of the guide rails 55 so that they can be slided vertically. As best shown in FIG. 6, each of these sliders 56 is provided with a groove 56a within which a pair of horizontal guide rails 57 mounted on the side of the beam 16c of the frame 16 are fitted.

As shown in FIG. 4, a leading end of a cylinder 58 for moving the seedling picking-out support 51 is rotatably mounted on a plate 59 fixed to the beam 16c of the frame 16, and a leading end of a piston rod 58a of the cylinder 58 is rotatably connected to a plate 60 of the seedling picking-out support 51 through a pin 61. According to the above construction, when the piston rod 58a of the cylinder 58 is expanded and is retracted, the seedling picking-out support 51 can be moved vertically and horizontally.

Figure 7:
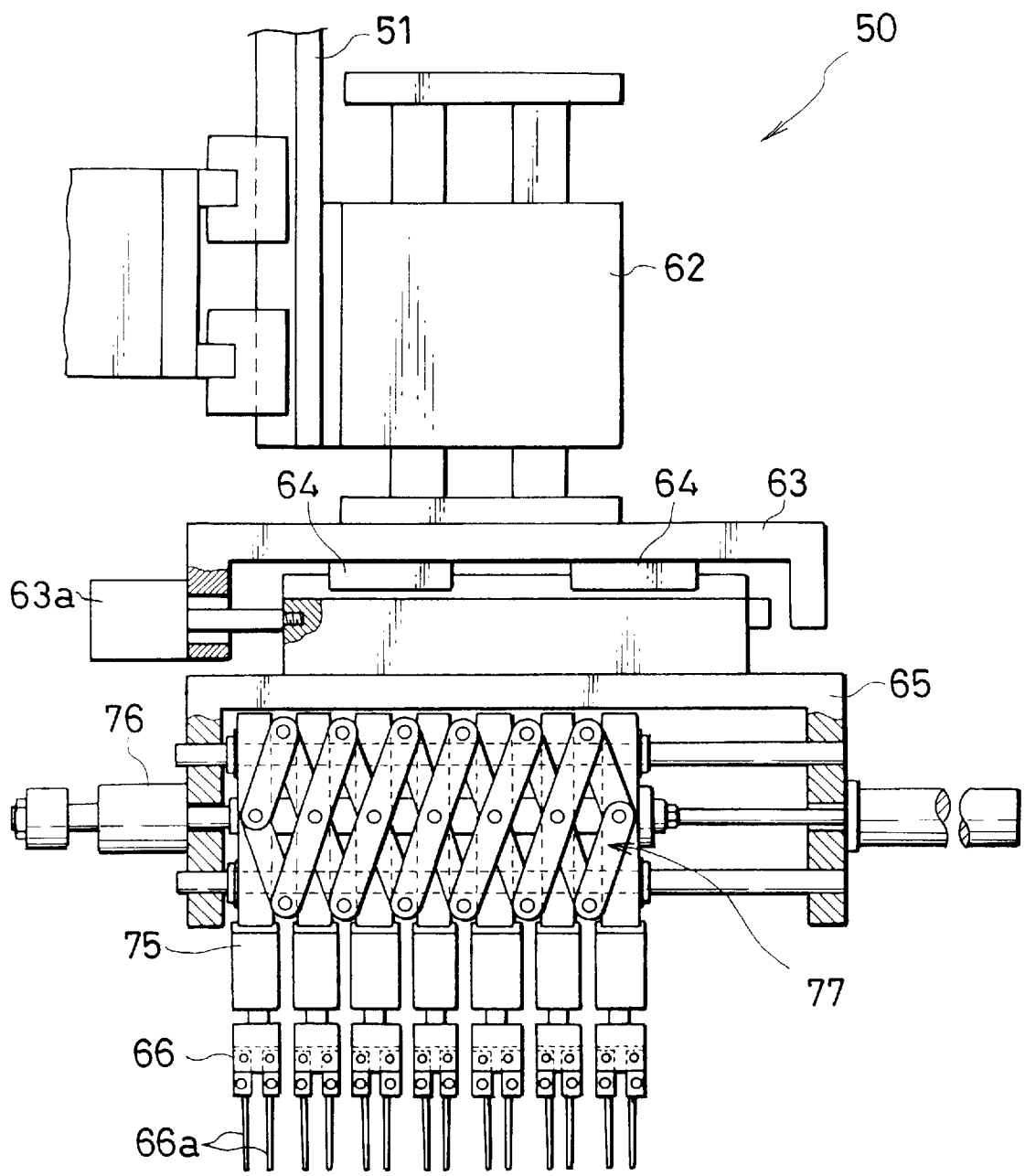
FIG. 7 is a schematic side view of a seedling picking-out mechanism.

As shown in FIG. 7, the seedling picking-out mechanism 50 includes a raising and lowering portion 63 which is vertically moved through a cylinder 62 mounted on the seedling picking-out support 51, and a supporting member 65 which is mounted on the raising and lowering portion 63 to be slided along guide rails 64 on the bottom side of the raising and lowering portion 63 through a cylinder 63a. Also, the seedling picking-out mechanism 50 includes seven picking-out claws 66 for picking out the plug seedling G. As best shown in FIG. 9A, each of the picking-out claws 66 consists of a pair of claw members 66a, and a supporting piece 67 is mounted on the base of each of the picking-out claws 66. Each of the supporting pieces 67 is rotatably mounted on an enlarged portion 68a provided at a leading end of a rod member 68 through a pin 67a. Each of the supporting pieces 67 is connected by a spring 80 so that the leading end of each of the picking-out claws 66 is normally closed.

Figure 8:
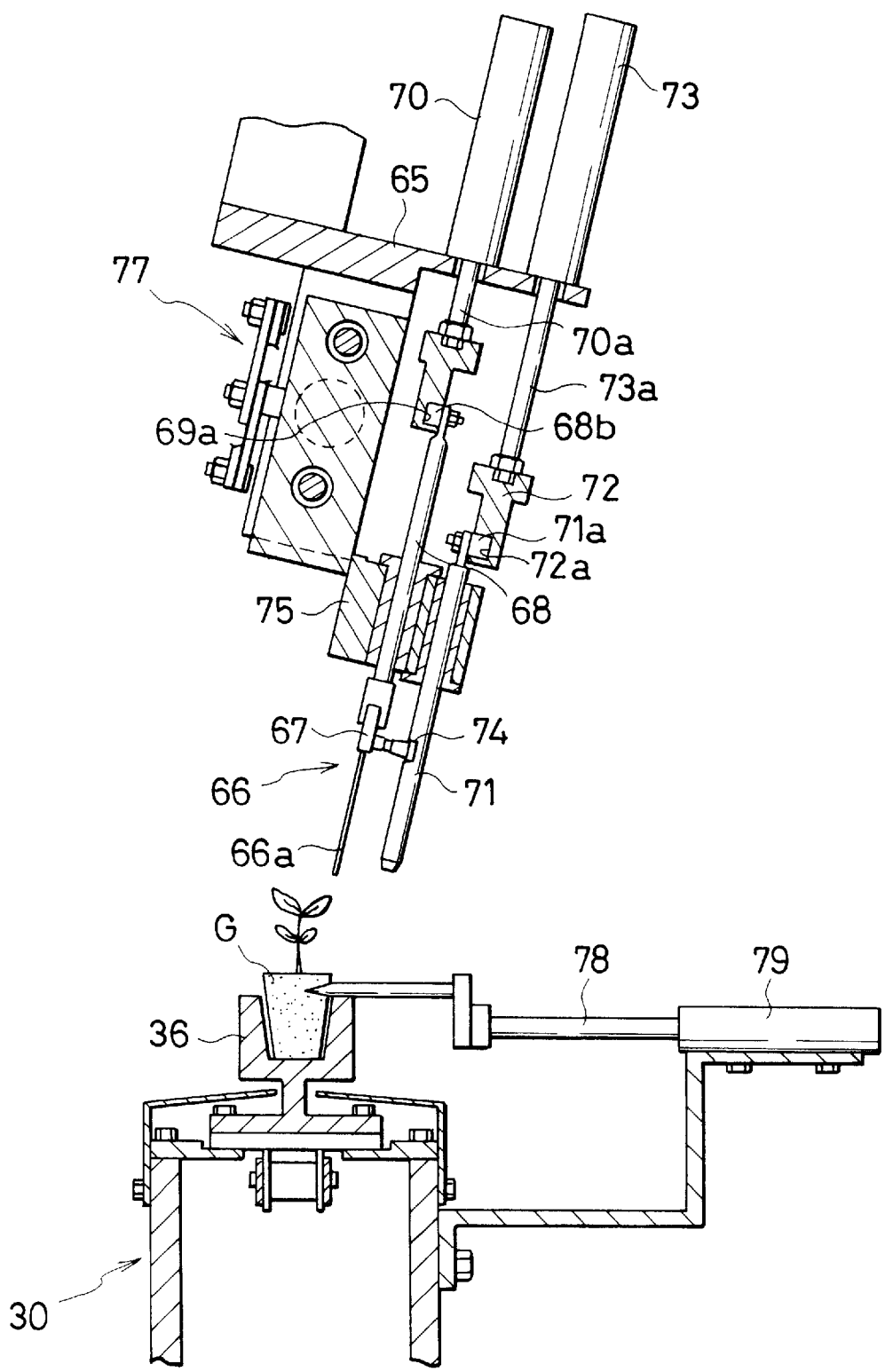
FIG. 8 is a schematic front view of the seedling picking-out mechanism.

As shown in FIG. 8, a rail member 69 is connected to a piston rod 70a of a cylinder 70 mounted on the supporting member and a roller 68b mounted on the upper end of the rod member 68 is fitted within a recess 69a provided on the lower portion of the rail member 69. A claw opening and closing member 71 made from round bar is disposed adjacent to the picking-out claw 66. A second rail member 72 is connected to a piston rod 73a of a cylinder 73 mounted on the supporting member 65 and a roller 71a mounted on the upper end of the claw opening closing member 71 is fitted within a recess 72a provided on the lower portion of the second rail member 72. Each of the supporting pieces 67 is provided with a roller 74 extending toward the claw opening and closing member 71 and these rollers 74 abut with respect to each other through the effect of the spring 80. Also, each of the rod member 68 and the claw opening and closing member 71 is supported by each guide member 75 to be slided vertically. According to the above construction, when the claw opening and closing member 71 is lowered to be pushed into between the rollers 74, as shown in FIG. 9B, the space between the rollers 74 is widened by the diameter of the claw opening and closing member 71, and thus, the picking-out claw 66 is opened. Further, the claw opening and closing member 71 is provided at its leading end with a beveled portion 71b in order to facilitate the pushing of the claw opening and closing member 71 into the space between the rollers 74.

On the other hand, as shown in FIG. 7, the supporting member 65 is provided with a pantograph mechanism 77 adapted to be moved horizontally through a cylinder 76, and each guide member 75 is connected to the pantograph mechanism 77. According to the above construction, the interval between the adjoining picking-out claws 66 can be adjusted by horizontally moving the pantograph mechanism 77 through the cylinder 76, and at the same time, the entire position of the picking-out claws 66 can be adjusted by horizontally moving the supporting member 65 through the cylinder 63a.

In addition, as shown in FIGS. 1 and 8, each of the picking-out claws 66 and the claw opening and closing members 71 is mounted at a certain angle to each cup 36 in the seedling transfer mechanism 30. Also, as shown in FIG. 8, a plug seedling holding member 78 is provided to piercing to the soil mass covering the plug seedling G in synchronization with the pulling-out of the picking-out claw 66 by a cylinder 79 fixed to the seedling transfer mechanism 30, in order to prevent the plug seedling G from being pulled out together with the picking-out claw 66 during the pulling-out of the picking-out claws 66 from the plug seedling G in the cup 36.

Figure 10:
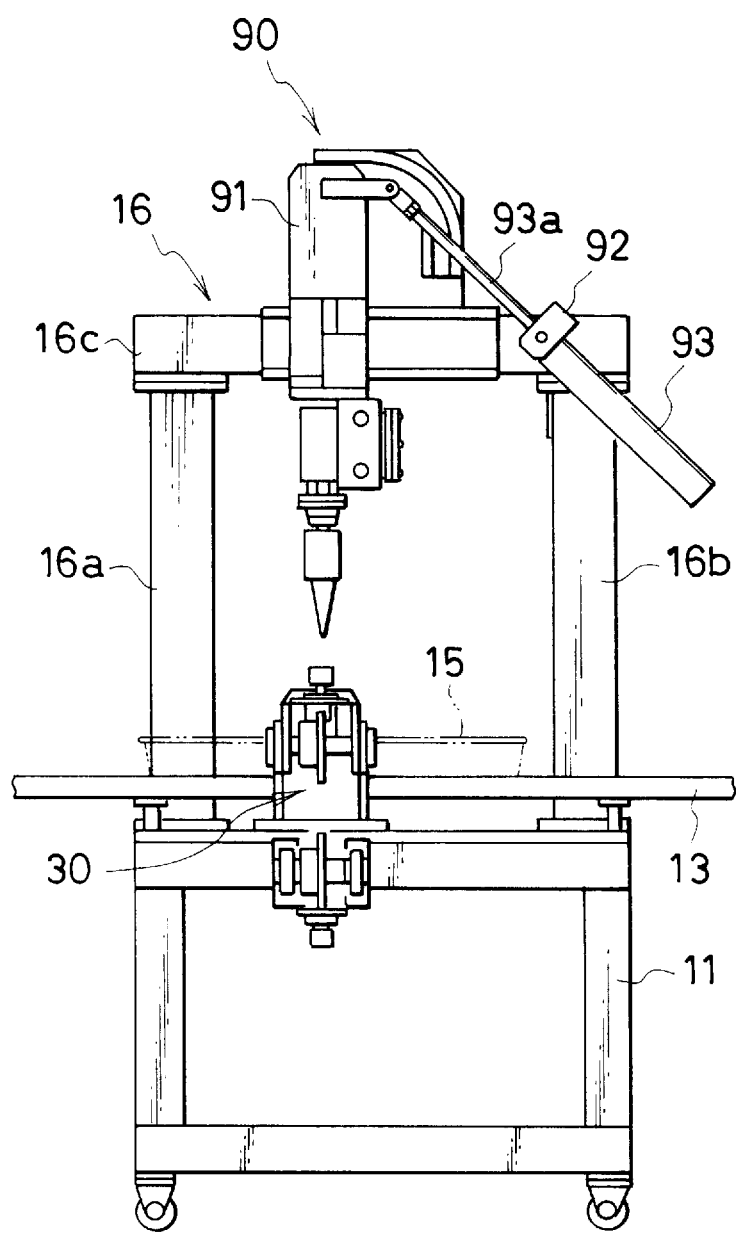
FIG. 10 is a schematic right side view of the transplanter.

As mainly shown in FIGS. 1 and 10, the seedling planting mechanism 90 for picking out the plug seedling G from the cup 36 in the seedling transfer mechanism 30 and planting it in the transplanted seedling tray 15 includes a seedling planting support 91. Also, the seedling planting mechanism 90 is provided with a system substantially similar to the system for moving the seedling picking-out support 51, which is already explained with reference to FIGS. 4 to 6. The seedling planting support 91 can be moved vertically and horizontally by extending and retracting a piston rod 93a of a cylinder 93 which is rotatably mounted on a plate 92 fixed to the beam 16c of the frame 16.

Figure 11:
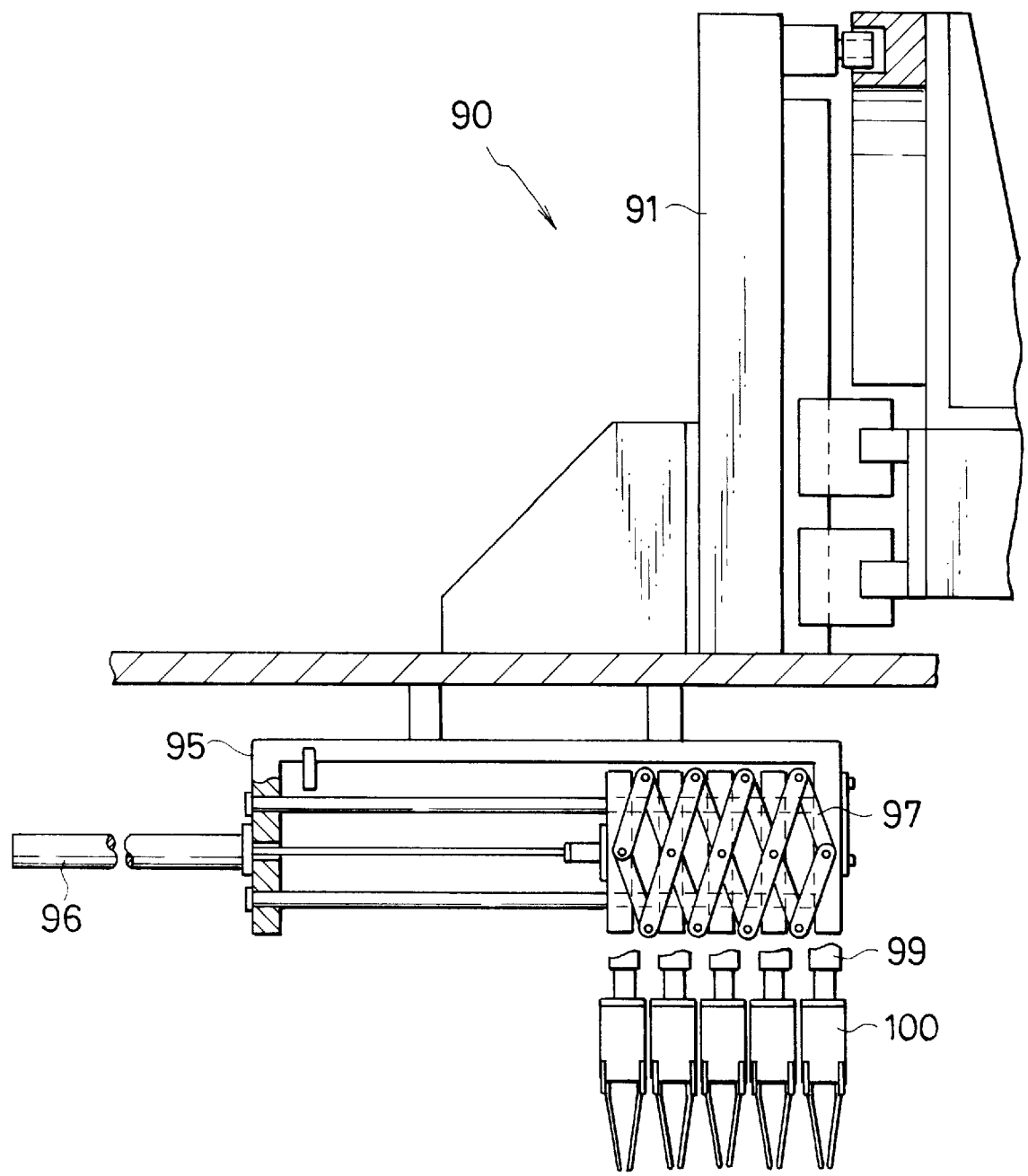
FIG. 11 is a schematic front view of a seedling planting mechanism.
Figure 12:
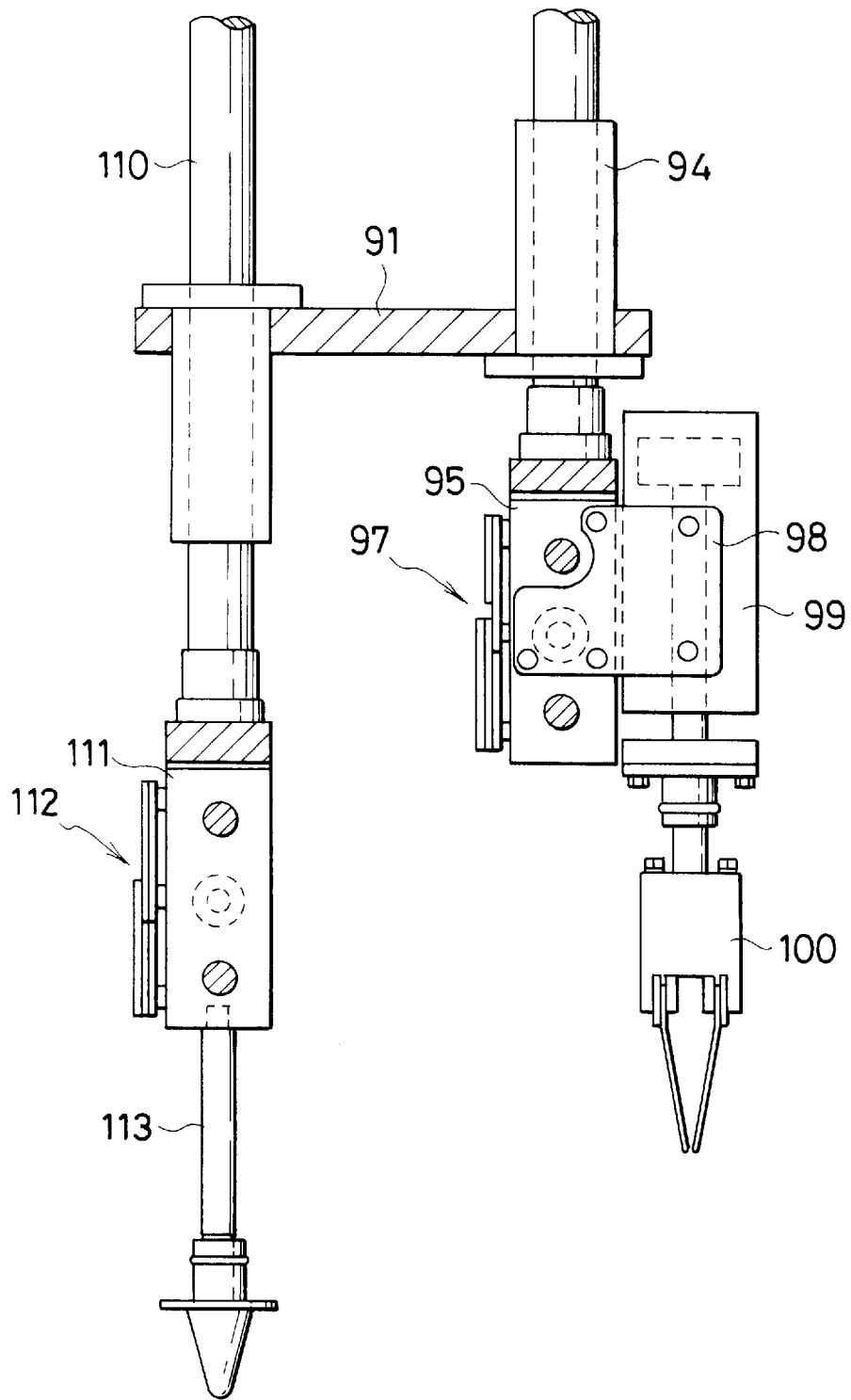
FIG. 12 is a schematic side view of the seedling planting mechanism.

As shown in FIG. 11, the seedling planting mechanism 90 includes a supporting member 95 which is secured to the seedling planting support 91 and which is provided with a pantotraph mechanism 97 adapted to be moved horizontally by a cylinder 97. As shown in FIG. 12, five raising and lowering actuators 99 are mounted on the pantograph mechanism 97 through a mounting plate 98, and a planting claw 100 for planting the plug seedling G in the transplanted seedling tray 15 is connected to each of the leading ends of the raising and lowering actuators 99.

Figure 13A:
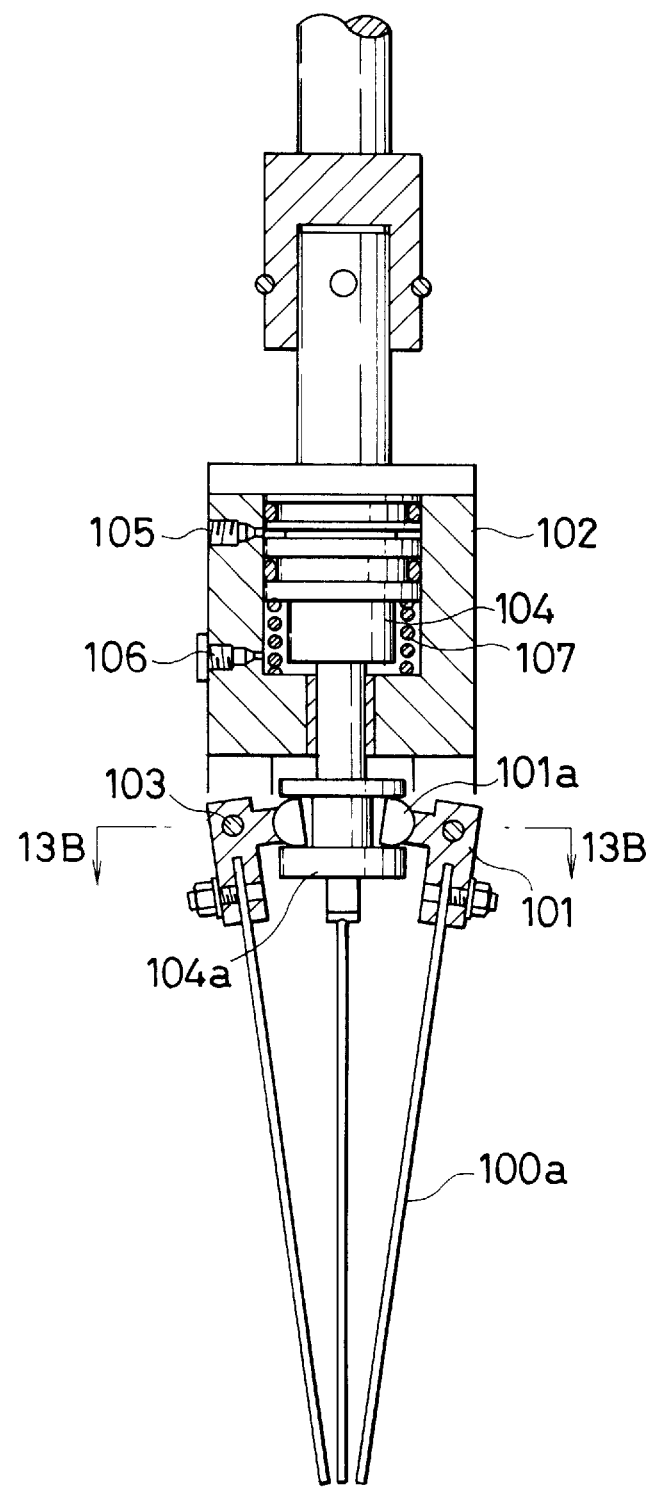
FIG. 13A is an enlarged cross-sectional view of a seedling planting claw.
Figure 13B:
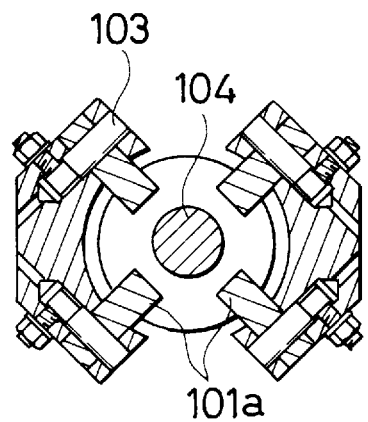
FIG. 13B is a enlarged cross-sectional view taken from arrows 13B—13B in FIG. 13A.

As shown in FIG. 13A in detail, each of the planting claws 100 is provided with four claw members 100a, only three of which are shown in FIG. 13A, and a supporting piece 101 provided at its end with a cam 101a is mounted on each of the base portions of the claw members 100a. On the other hand, a body 102 providing a cylinder case of a slide actuator is disposed above the seedling planting claw 100. As shown in FIG. 13B, four pins 103 are mounted on the lower portion of the body 102 to be spaced at almost 90°, and each of the supportin g pieces 101 is swingably supported through a pin 103. A moving portion 104 is slidably contained in the interior of the body 102, and a cam 101a is fitted within an annular portion 104a provided at the leading end of the moving portion 104. The body 102 is provided with an air supply port 105 for supplying a compressed air into the cylinder case and a port 106 for connecting to a silencer (not shown). A spring 107 for biasing the moving portion 104 of the cylinder case upwardly is mounted on the moving portion 104. According to the above construction, when compressed air is supplied through the air supplying port 105 to the cylinder case, the moving portion 104 is moved downwardly. As a result, the annular portion 104a pushed the cam 101a so that four claw member 100a are opened. On the other hand, when compressed air is exhausted through the air supplying port 105, the moving portion 104 is moved upwardly through the effect of a spring 107 thereby closing four claw members 100a.

Further, as mainly shown in FIG. 12, the seedling planting mechanism 90 includes a supporting member 111 which is moved vertically through a cylinder 110 mounted on the seedling planting support 91, adjacent the supporting member 95 and which is equipped with a pantograph mechanism 112 adapted to be moved horizontally through the cylinder 110. The pantograph mechanism 112 is provided with holing devices 113 having the leading end of each of which is shaped generally conical, as many as adjoining planting claws 100, to facilitate the planting of the plug seedling by holing the soil contained in the cells 15a of the transplanted seedling tray 15. According to the above construction, when the holing devices 113 are lowered, it holes the soil in the cell 15a of the transplanted seedling tray 15.

Figure 15A:
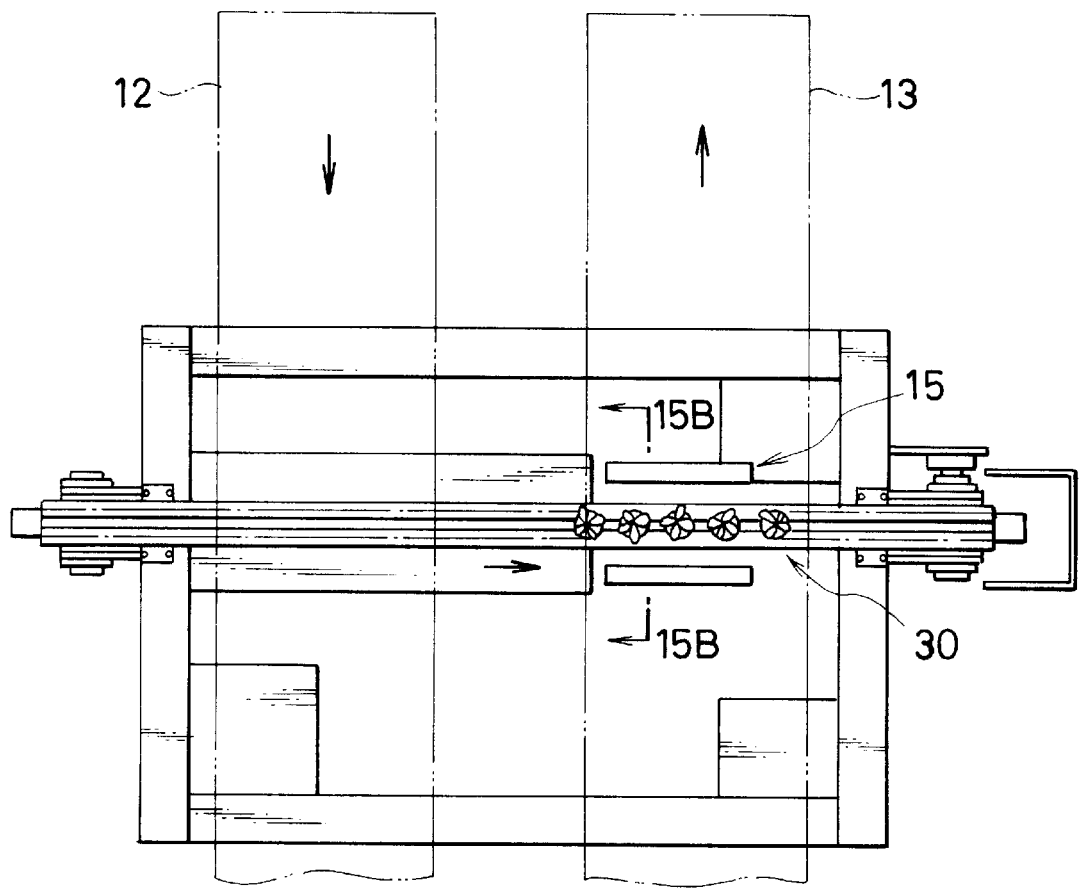
FIGS. 15A and 15B are views showing a sensor which judges whether the plug seedling has a desired size.
Figure 15B:
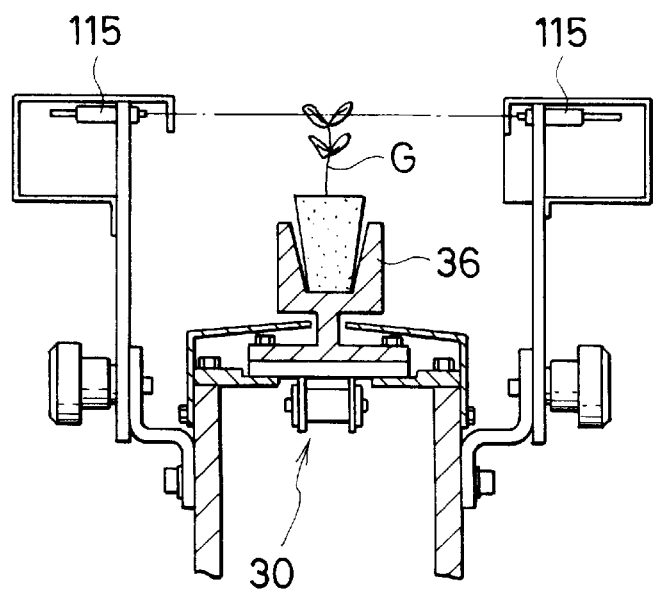

As shown in FIGS. 15A and 15B, a sensor 115 to judge whether the plug seedling G contained in the cup 36 has a desired size is provided on the seedling transfer mechanism 30 above the transplanted seedling tray 15.

Figure 16:
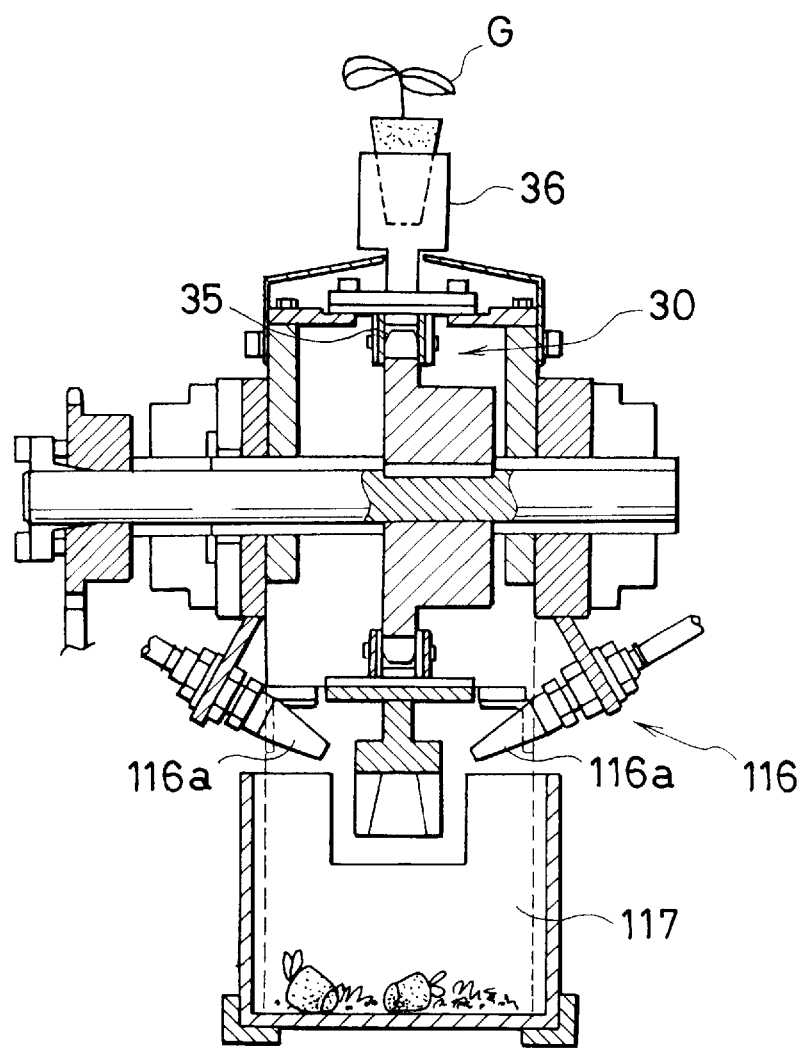
FIG. 16 is a schematic view showing a washing station.

As shown in FIG. 16, the seedling transfer mechanism 30 is provided at its lower portion with a washing station 116 for flowing off the soil remained in the cup 36. The washing station 116 includes a washing nozzle 116a, an air compressor(not shown) connected to the washing nozzle 116a through a pipe, and a box 117 for containing the soil blasted off by air.

How a plug seedling G is transplanted by the transplanter 10 constructed in accordance with the above will now be explained.

Figure 17A:
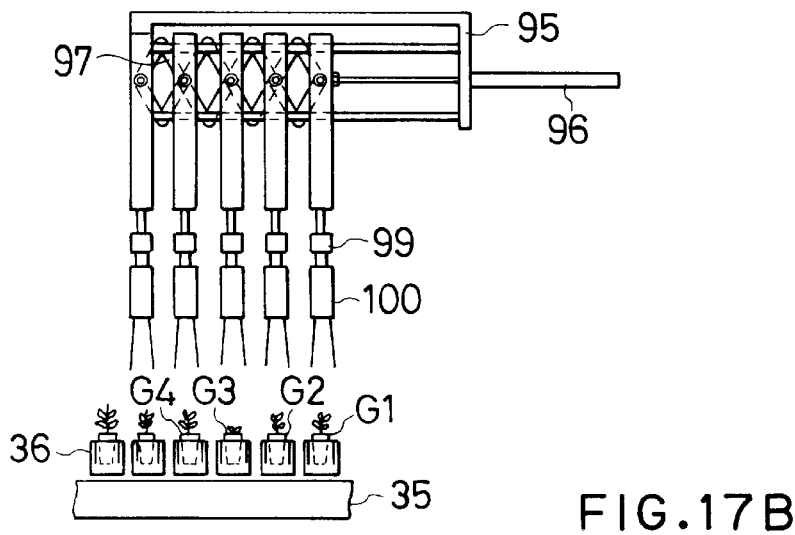
FIGS. 17(a) to 17(c) are views showing a series of steps wherein the plug seedling is picked out from a cup by a planting claw.
Figure 17B:
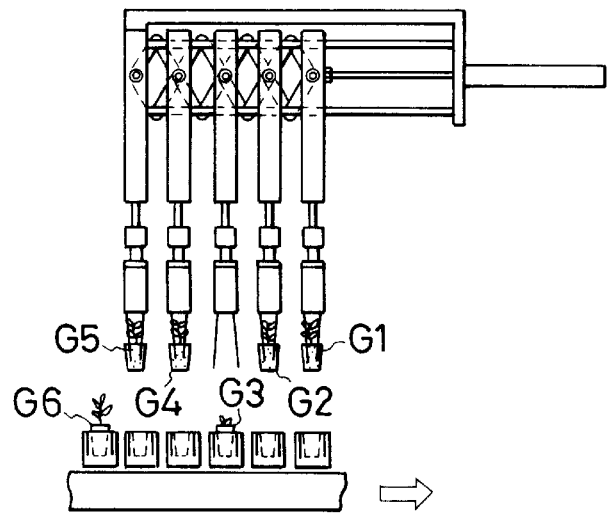
Figure 17C:
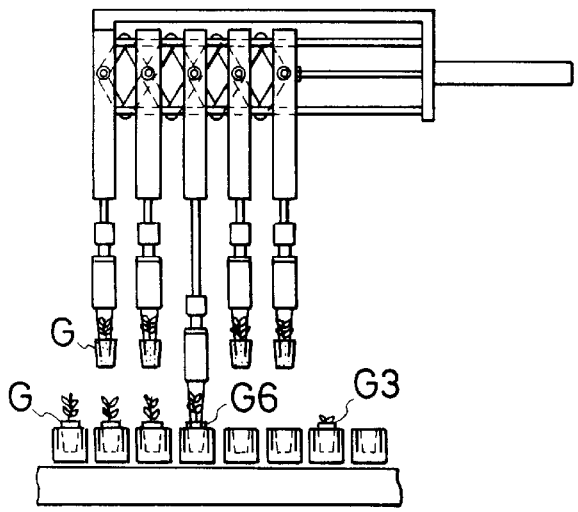

After the seedling picking-out support 51 is moved above the cell 14a of the plug seedling tray 14 to be picked out, the picking-out claws 66 is lowered to the position shown in FIG. 3 in chain line by extending the cylinder 62. Then, each picking-out claw 66 and the supporting member 65 are moved by the cylinder 76 and the cylinder 63d so that the endmost picking-out claw 66 is located at the endmost cell 14a and the interval of each picking-out claw 66 corresponds to that of the interval of each cell 14a. Thereafter, after the claw opening and closing member 71 is lowered to open the picking-out claw 66 and insert it into the cell 14a, the claw opening and closing member 71 is raised to grasp the plug seedling G by the picking-out claw 66. Then, the picking-out law 66 is raised to introduce the plug seedling G into the corresponding cup 36 of the seedling transfer mechanism 30. When the chain 35 of the seedling transfer mechanism 30 is moved and the cup 36 in which the plug seedling G is contained passed across the sensor 115, whether the plug seedling G has a desired size or not is judged. Then, after the seedling planting support 91 is located above the seedling transfer mechanism 30, the planting claws 100 are moved to the position directly above the cup 34 in which the plug seedling G to be planted is contained, thereby opening the claw members 100a, as shown in FIG. 17(a). Then, after the planting claws 100 is lowered by the raising and lowering actuators 99 to grasp the plug seedling through the slits 36c of the cup 36, the planting claws 100 are raised. At this point in time, if there is a plug seedling G3 which is judged by the sensor 115 not to have a desired size, the plug seedling G3 is not grasped by the planting claw 100, as shown in FIG. 17(b). If there is the planting claw 100 which does not grasp the plug seedling, as shown in FIG. 17(c), the chain 35 of the seedling transfer mechanism 30 is advanced until the corresponding planting claw 100 is located above the next leading normal plug seedling G6, thereby grasping the plug seedling G6. Together with the grasping operation of the plug seedling by the planting claw 100, each of the holing devices 113 holes the soil in the cell 15a of the transplanted seedling tray 15. Then, the planting claw 100 grasping the plug seedling G is moved above the corresponding cell 15a of the transplanted seedling tray 15 to plant the plug seedling G in the cell 15a. Further, in the washing station 116, the soil remained in the cup 36 is blown off. By repeating such an operation, the plug seedling G can be transplanted.

The present invention has thus been shown and described with reference to a specific embodiment. However, it should be noted that the present invention is in no way limited to the details of the described arrangements but changes and modifications may be made without departing from the scope of the appended claims.

Figure 18:
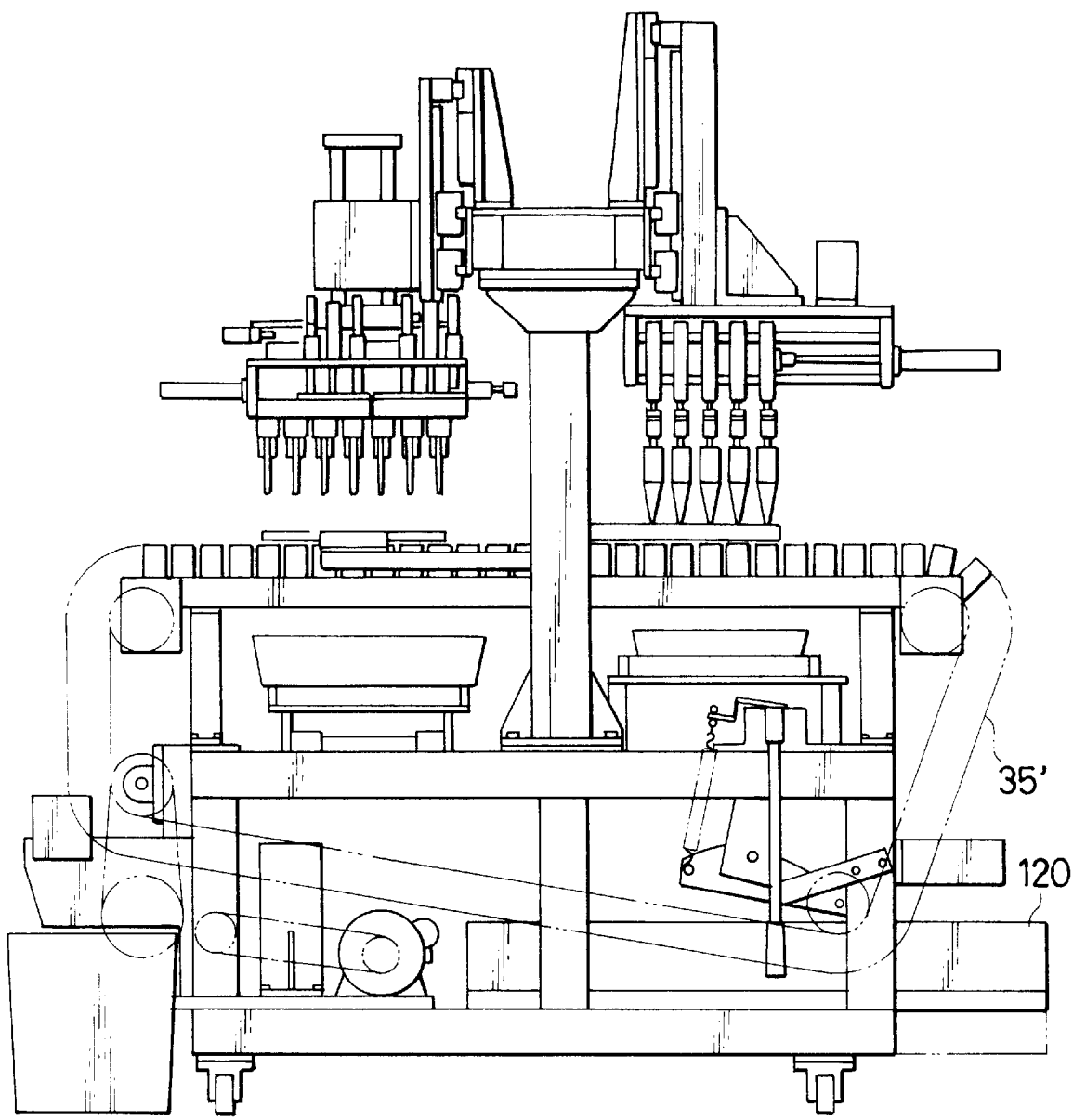
FIG. 18 is an alternative embodiment wherein a part of the chain of the seedling transfer mechanism is passed through a tank in which disinfection liquid is contained.

For example, in the above-mentioned embodiment, as shown in FIG. 1, the chain 35 of the seedling transfer mechanism 30 is located above the base 11. However, as shown in FIG. 18, the transplanter may be arranged such that a tank 120 for disinfection liquid is provided below the base 11 and a part of a chain 35' is passed through the tank 120.

Figure 19:
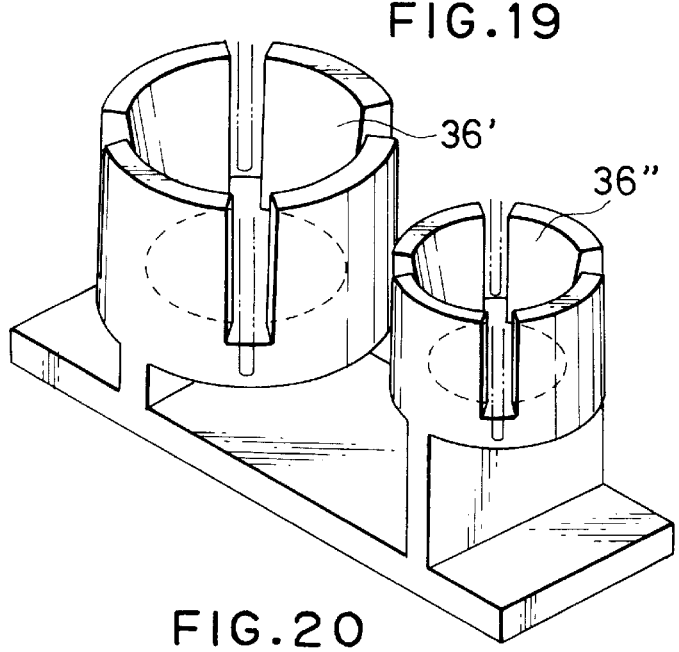
FIG. 19 is a schematic view showing a seedling transfer mechanism having cups of different size.
Figure 20:
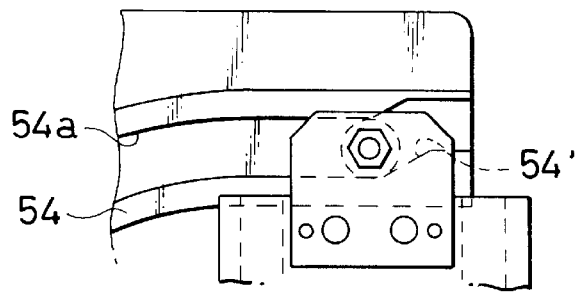
FIG. 20 is a further alternative embodiment of the seedling picking-out mechanism.

Further, in the above-mentioned embodimant, as shown in FIG. 14, the cups 36 mounted on the outer peripheral surface of the chain 35 of the seedling transfer mechanism 30 are of only one type. However, as shown in FIG. 19, two type of cups 36' and 36" each of which has a different size or depth may be mounted on the outer peripheral surface of the chain, so as to deal with the different size of the plug seedling. In this case, the upper surface of the cup 36' is consistent with that of the cup 36", so that the sensor can sense undergrown seedlings under a certain condition. In addition, as shown in FIG. 20, the arcuate roller guide 54 of the seedling picking-out mechanism 50 may be provided at its upper end with a curved portion 54' so that, in the case where the seedling picking-out support 51 is moved above the plug seedling tray 14, the height of the seedling picking-out support 51 can be selected to either of two stages in accordance with the size of the plug seedling.

Figure 21:
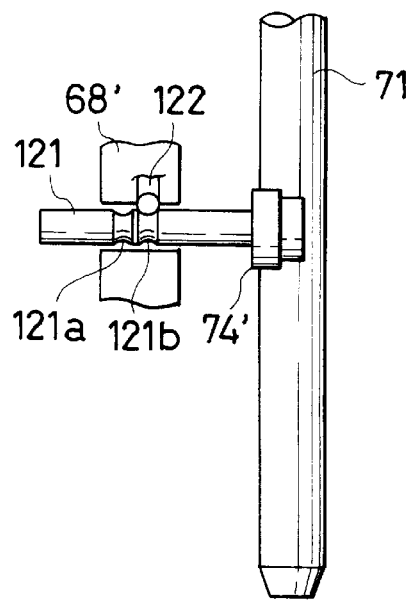
FIG. 21 is a further alternative embodiment of the picking-out claw of the seedling picking-out mechanism.

Further, in the above-mentioned embodiment, the degree of the opening and closing of the picking-out claw 66 is determined to the diameter of the roller 74. However, as shown in FIG. 21, a stepped roller 74' may be provided so that the degree of the opening and closing of the picking-out claw can be modified in accordance with the size of the plug seedling. A shaft 121 provided at its leading end with the stepped roller 74' and provided at its central portion with two recesses 121a and 121b is inserted into a through-hole in the enlarged portion 68a', and the degree of the opening and closing of the picking-out claw 66 can be modified by locking a piece 122 at either recesses 121a or 121b.

Figure 22:
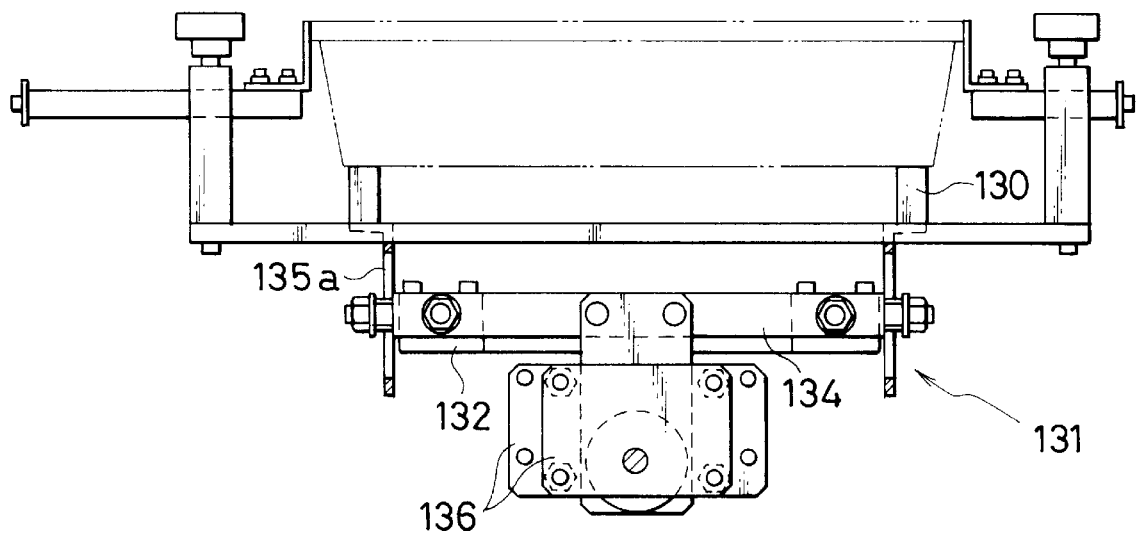
FIG. 22 is a schematic front view of a height adjusting device of a transplanted seedling carrying means.
Figure 23:
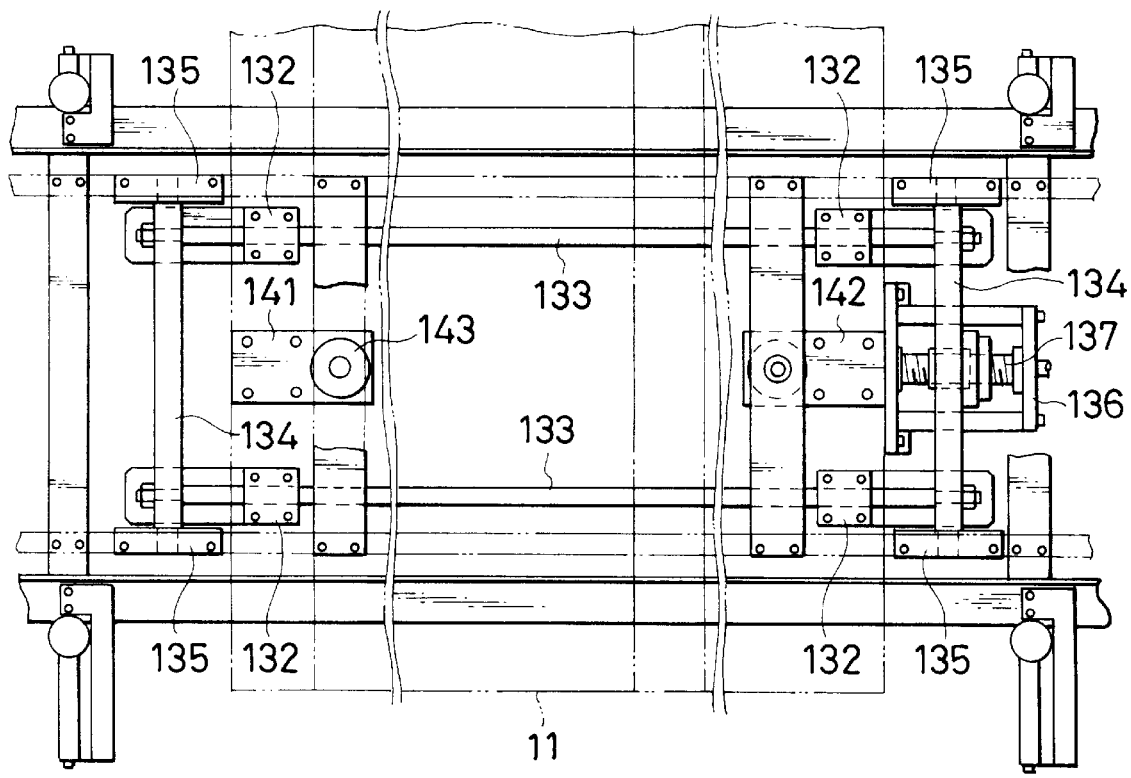
FIG. 23 is a schematic plan view of the height adjusting device of the transplanted seedling carrying means.
Figure 24:
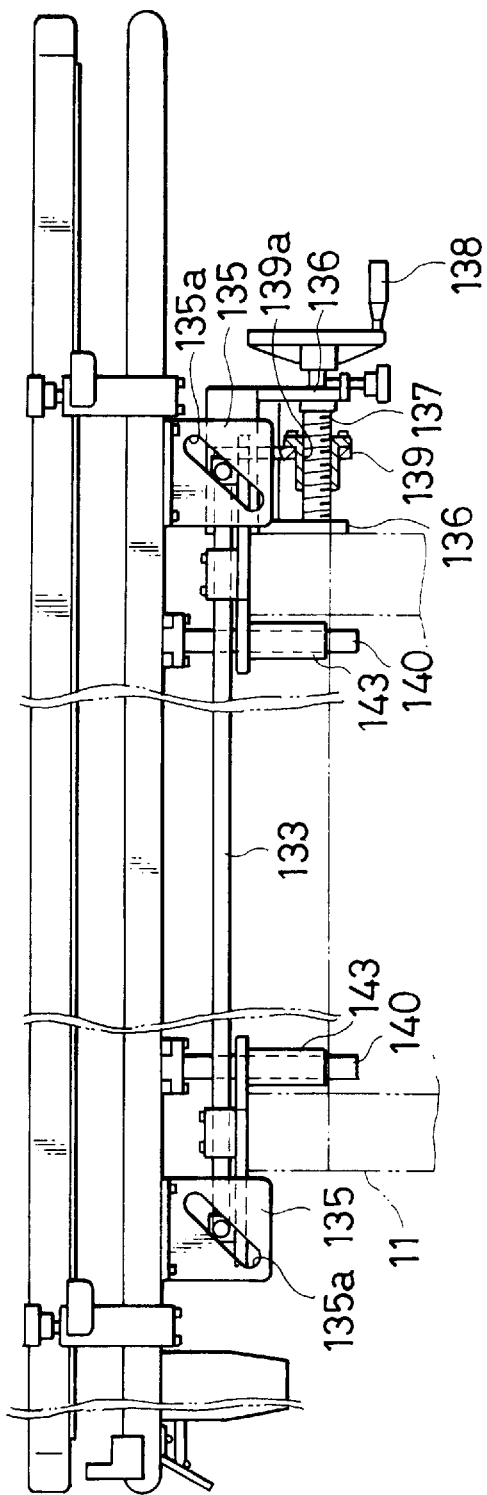
FIG. 24 is a schematic side view of the height adjusting device of the transplanted seedling carrying means.
Figure 25:
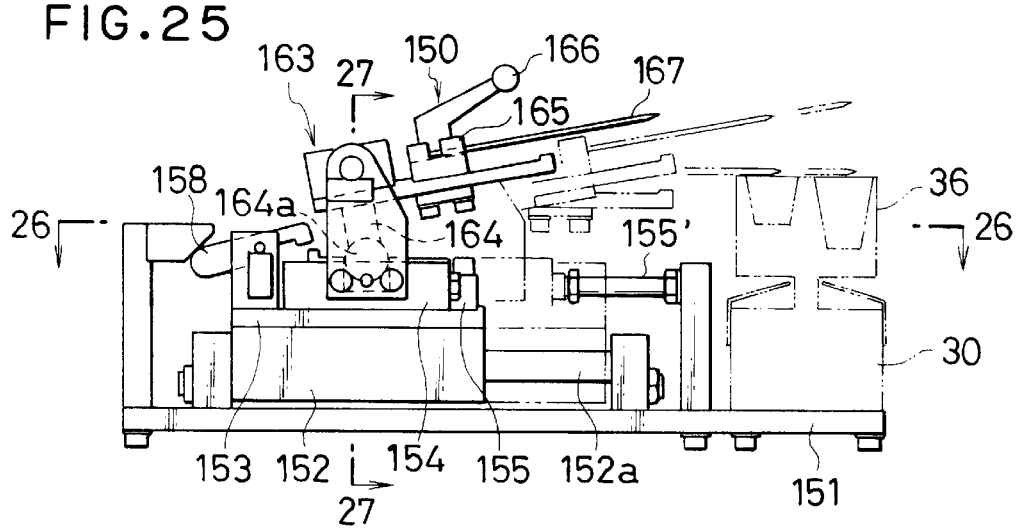
FIG. 25 is a schematic view showing a seedling pushing device.
Figure 26:
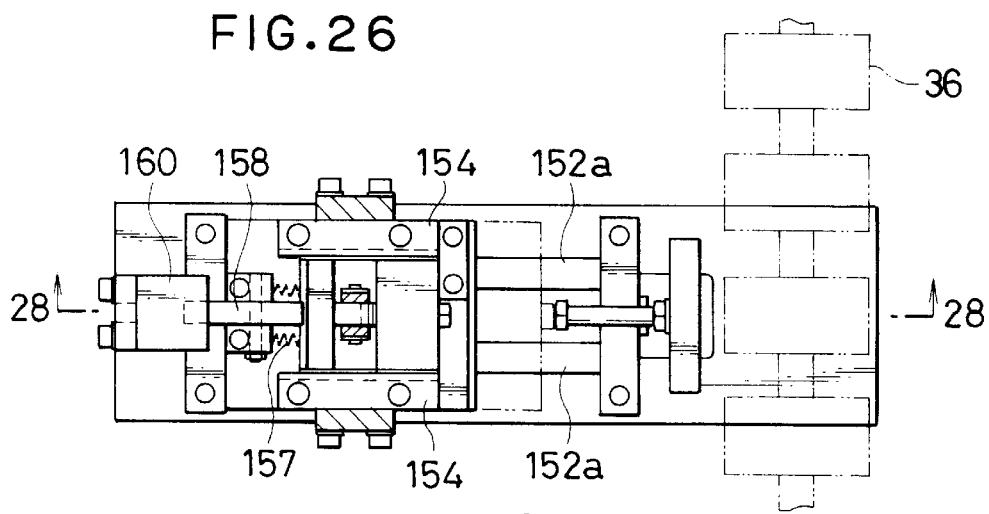
FIG. 26 is a view taken from arrows 26—26 in FIG. 25.
Figure 27:
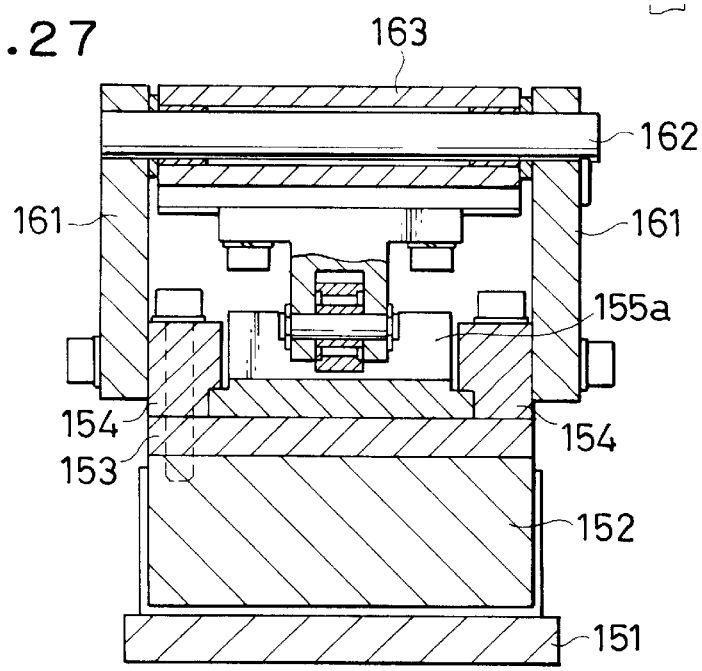
FIG. 27 is a view taken from arrows 27—27 in FIG. 25.

Furthermore, in the above-mentioned embodiment, the transplanted seedling carrying means 13 is not arranged such that its height can be adjusted. However, as shown in FIGS. 22 to 24, a height adjusting device 131 for the transplanted seedling carrying means 13 may be provided so that a height of the tranplanted seedling carrying means 13 can be adjusted in accordance with the size of the plug seedling G. The height adjusting device 131 includes a pair of slide members 133 slidably supported on a plate 132 fixed to the base 11, and a pair of support members 134 each connected to the both ends of the slide members 133. As best shown in FIG. 23, the slide members 133 and the support members 134 as a whole provide a rectangular framework. The frame 130 of the transplanted seedling carrying means 13 is provided with four plates 135 each having a diagonal directed slot 135a, and the both ends of each support member 134 are slidably fitted within the solts 135a respectively. Also, the height adjusting device 131 includes a threaded shaft 137 which is rotatably supported on a pair of plates 136 mounted on the base 11, and a handle 138 is mounted on one end of the threaded shaft 137. A plate 139 provided with a threaded hole 139a is mounted on the center portion of one of the support members 134, and the threaded shaft 137 is screwed into the threaded hole 139a. Each of guide members 140 extending from the underside of the frame 130 downwardly is slidably fitted within each guide pipe 143 which is mounted on plates 141 and 142 fixed to the base 11.

According to the above construction, when the handle 138 is turned, the threaded shaft 137 rotates and thus, the plates 139 and the support members 134 are moved to right and left directions in FIG. 24.

At this point in time, each end of the support members 134 is slided along the slot 135a, and thus, the frame 130 is raised and lowered vertically, because each guide member 140 is fitted within the guide pipe 143.

Furthermore, in the above embodiment, the plug seedling holding member 78 is provided to prevent the plug seedling G from being pulled out together with the picking-out claw 66 during the pulling-out of the picking-out claw 66 from the plug seedling G contained in the cup 36. However, in order to prevent the pulling-out of the plug seedling more reliably, as shown in FIGS. 25 to 29, a seedling holding device 150 may be provided. The seedling holding device 150 includes an air cylinder 152 which is located to be slided in the direction perpendicular to the seedling transfer mechanism 30 through a rod 152a fixed to a plate 151 mounted on the seedling transfer mechanism 30. A plate 153 is mounted on the air cylinder 152. The seedling holding device 150 also includes a body 155 adapted to be slided in the direction perpendicular to the transplanted seedling carrying means 13 along a pair of rails 154 mounted on the plate. A stopper 155' is provided between the body 155 and the seedling transfer mechanism 30.

The body 155 is provided at its central portion and its one end with recesses 155a and 155b respectively, and an abutment 155c is provided at a portion opposite to the stopper 155'. A spring 157 is located between a mounting member 156 fixed to one end of the plate 153 and the recess 155b of the body 155 in order to bias the body 155 towards the right direction in FIG. 28. The almost central portion of a cam member 158 is pivotably mounted on the mounting member 156, and the front portion 158a of the cam member 158 is adapted to be biased upwardly due to a spring 159 mounted between the cam member 158 and the mounting member 159. The cam member 158 is provided at its rear portion 158b with an engaging portion 158c adapted to lock a projection 155c in the body 155. The front portion 158a of the cam member 158 is rounded, and an inclined portion 160a provided at a releasing member 160 opposite to the front portion 158a is adapted to engage with the front portion 158a. A shaft 162 is provided between side plates 161 mounted on both sides of the body 155, and a holding member support 163 is rotatably mounted on the shaft 162. An arm 164 provided at its leading end with a roller 164a is mounted on the underside of the holding member support 163, and is adapted to be pivoted smoothly during the sliding of the body 155, by introducing the roller 164a into the recess 155a.

Figure 29:
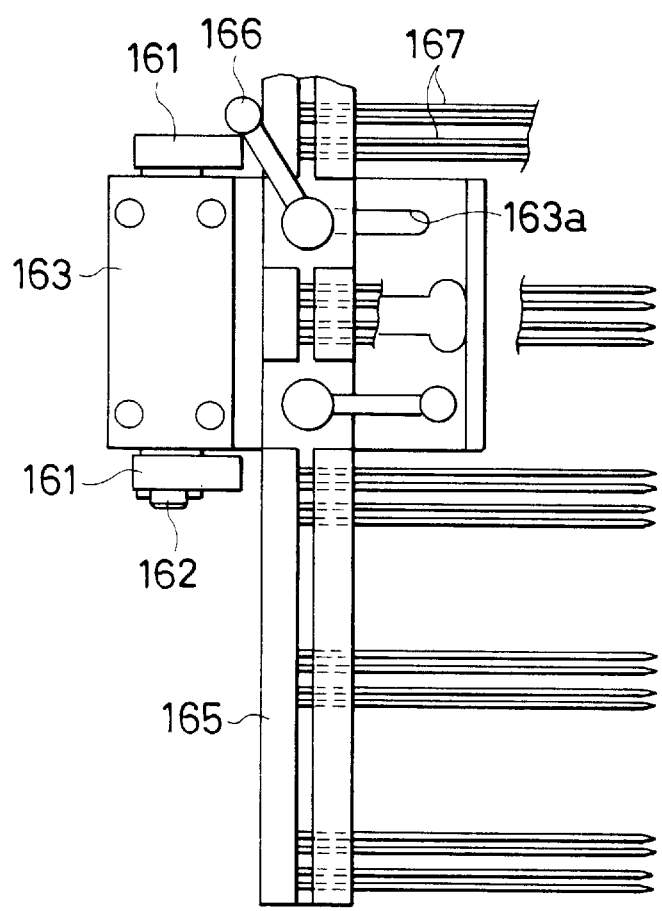
FIG. 29 is an enlarged view showing a seedling pushing support of the seedling pushing device.

As shown in FIG. 29, in order to adjust the holding position in accordance with the size of the cup 36, the holding member support 163 is provided with a holding member mount 165 to be guided along a slot 163a mounted on the holding member support, and the holding member mount 165 is adapted to be fixed by clamping a lock lever 166. The holding member mount 165 is provided with a plurality of pushing members 167 for holding each plug seedling G.

Figure 28:
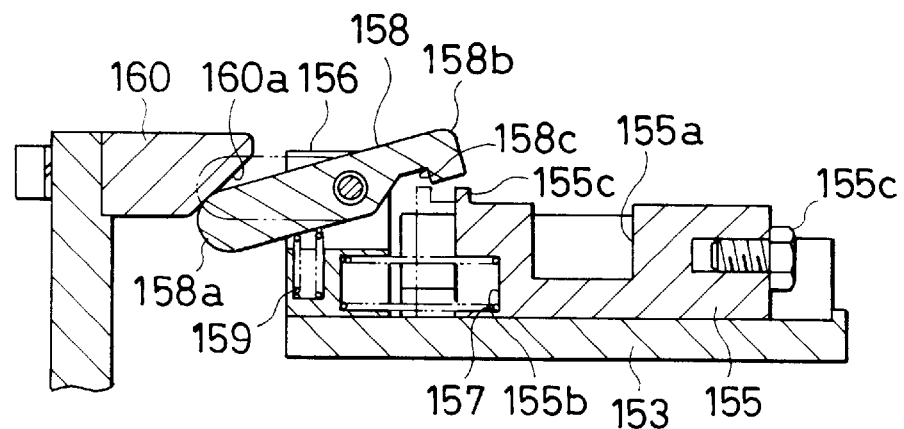
FIG. 28 is a view taken from arrows 28—28 in FIG. 26.

According to the above construction, when the air cylinder 152 is operated to be moved to the right in FIG. 28, the front portion 158a of the cam member 158 is disengaged from the releasing member 160 to be raised upwardly by the spring 159, and the engaging portion 158c of the cam member 158 is moved onto the projection 155c of the body 155.

In this condition, when the air cylinder 152 moves to the right further, the abutment 155c abuts the stopper 155'. Then, the body 155 is moved to the left in FIGS. 25 and 26 against the spring 157, and at the same time, the recess 155a of the body 155 is moved to the left, and thus, the arm 164 is pivoted to the left in FIG. 25, thereby causing the holding member 166 to be pivoted on the shaft 162 downwardly to push the cup 36. At this point of the time, the engaging portion 158c engages with the projection 155c of the body 155. Then, the air cylinder 152 moves to the left without accompanying the pivotal motion of the holding member 166 in the effect of the engagement.

Figure 30:
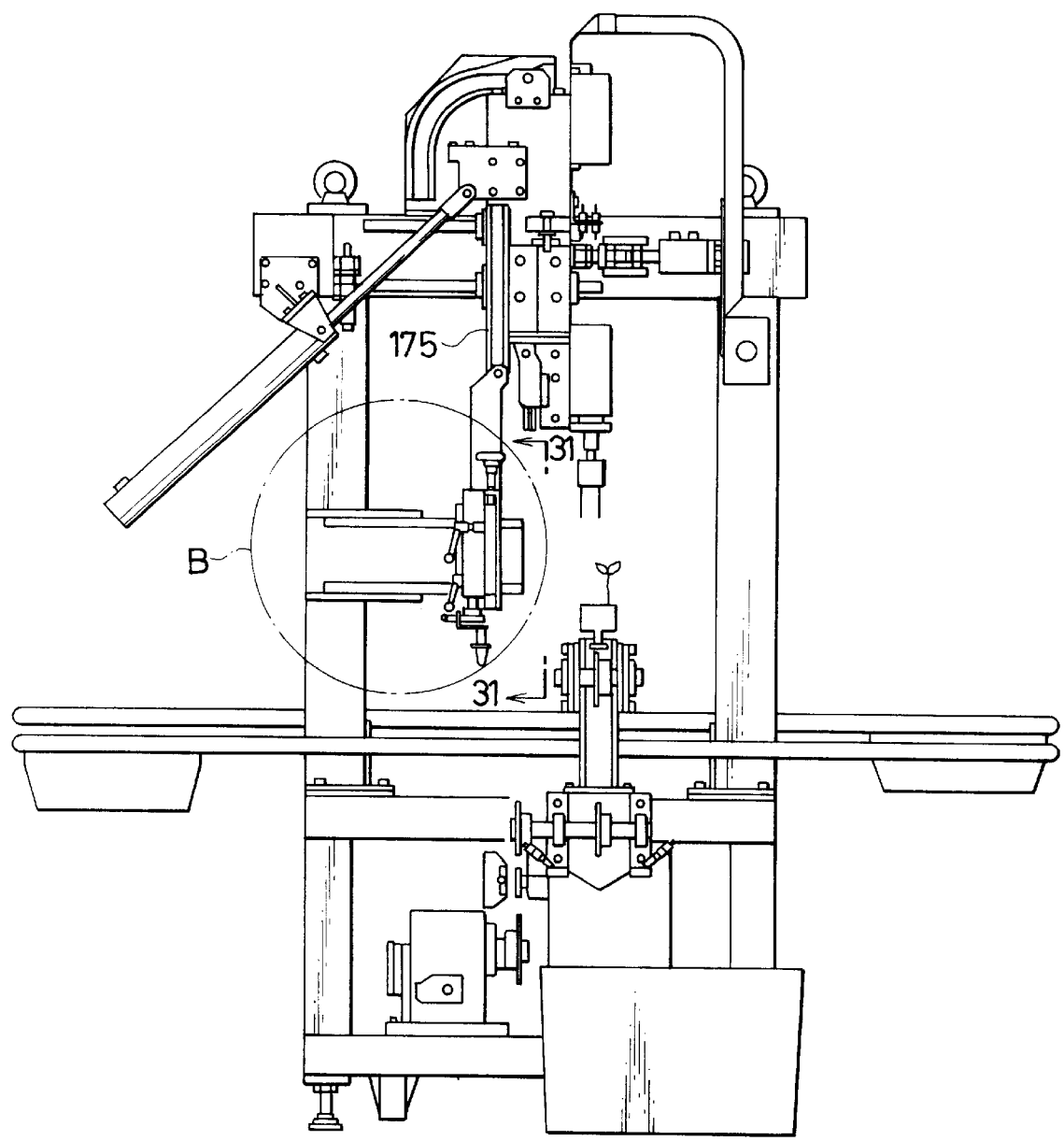
FIG. 30 is a shematic left side view of the transplanter showing the condition that a holing driving mechanism is mounted.
Figure 31:
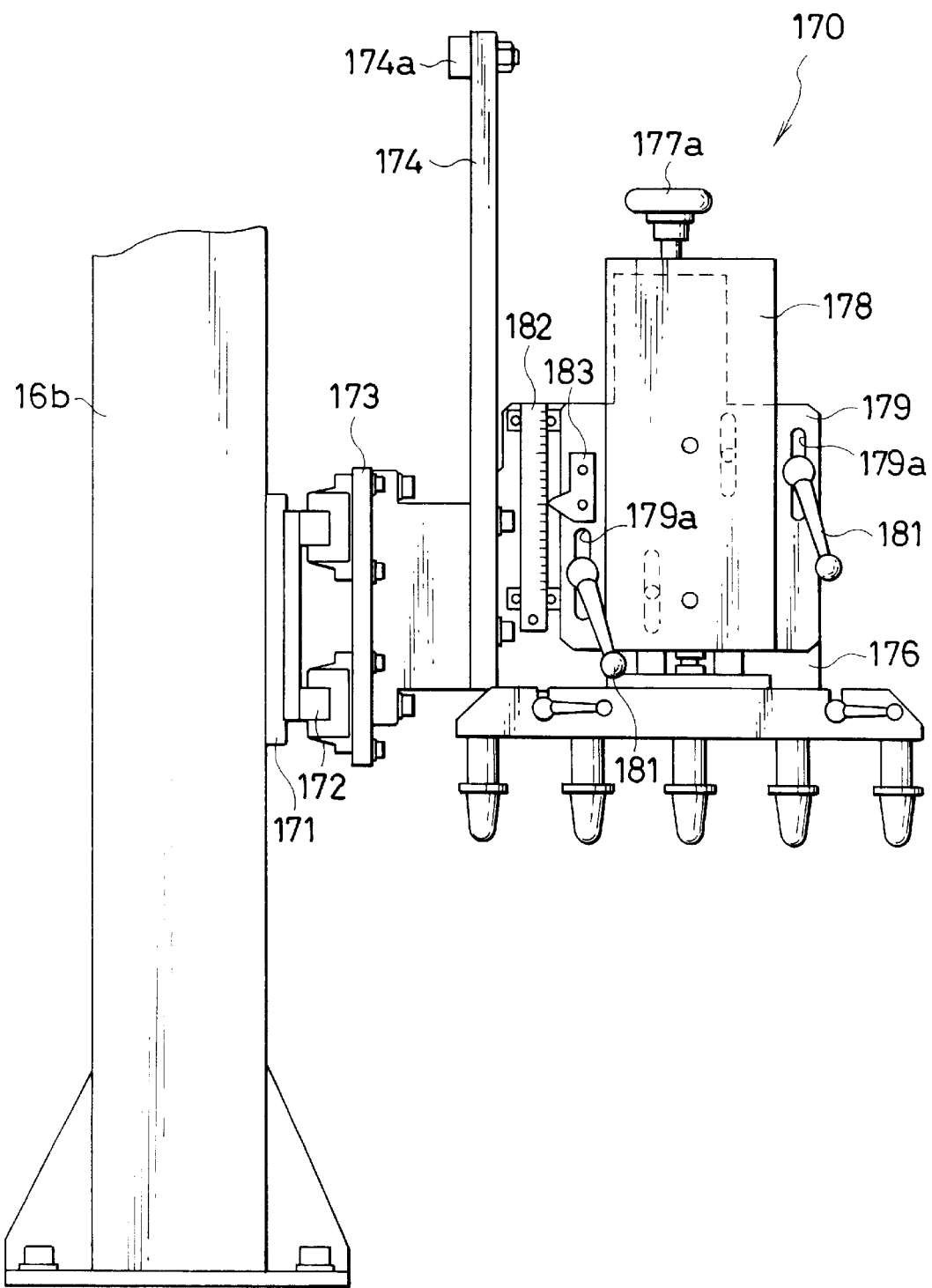
FIG. 31 is a view taken from arrows 31—31 in FIG. 30.
Figure 32:
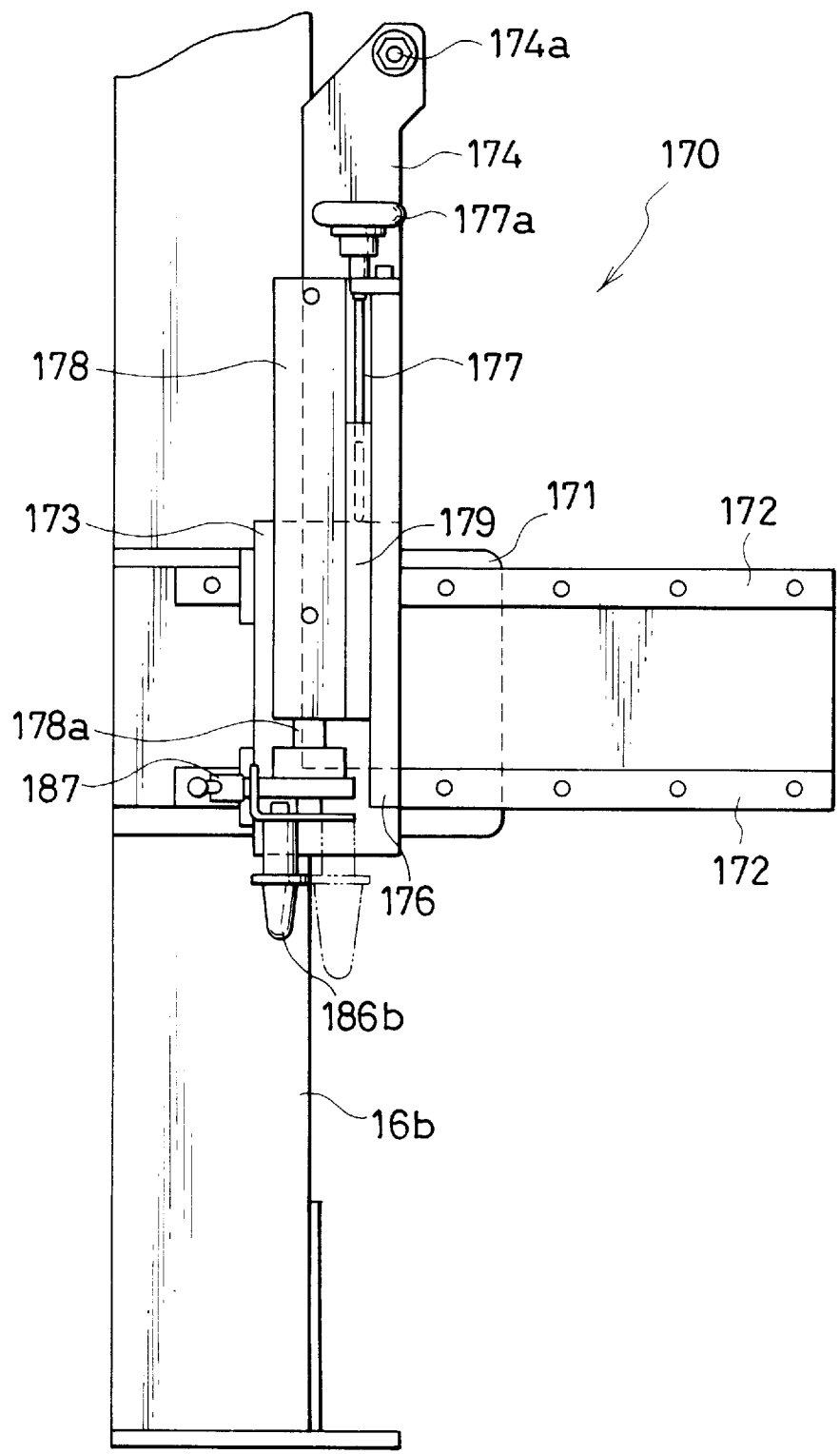
FIG. 32 is an enlarged view of "B" portion in FIG. 30.

Further, in the above embodiment, the planting claws 100 and the holing devices 113 is mounted on the seedling planting support 91. However, as shown in FIGS. 30 to 33, a holing rod driving mechanism 170 may be provided to move the planting claw 100 and the holing device 113 separately. The holing rod driving mechanism 170 includes a supporting frame 171 mounted on the column 16b of the frame 16, a pair of guide rails 172 mounted on the side of the supporting frame 171 horizontaly, a sliding support 173 fitted within the guide rails 172 to be slided horizontally, and a connecting member 174 extending from the sliding support 173 upwardly. The connecting member 174 is provided at its upper end with a cam roller 174a which is fitted within a cam rail 175 mounted on the side of the planting support 91 to be slided vertically, as shown in FIG. 30. A plate 176 is fixed to the sliding support 173, and a threaded shaft 177 provided at its upper end with a knob 177a is mounted on the plate 176. The holing rod driving mechanism 170 also includes a raising and lowering cylinder 178 on which a plate 179 is mounted. The threaded shaft 177 is screwed into a threaded hole (not shown) mounted on the plate 179.

Further, the plate 179 is provided with a slot 179a through which a screw 181 with a handle is screwed into a threaded hole (not shown) mounted on the plate 176. Furthermore, a scale 182 is mounted on the plate 176, and an indicator 183 is mounted on the plate 179. According to the above construction, by loosing the screw 181 and rotating the threaded shaft 177 with observing the position on the scale 182 which the indiocator 183 shows, the raising and lowering cylinder 178 can be adjusted to a desired height.

Figure 33:
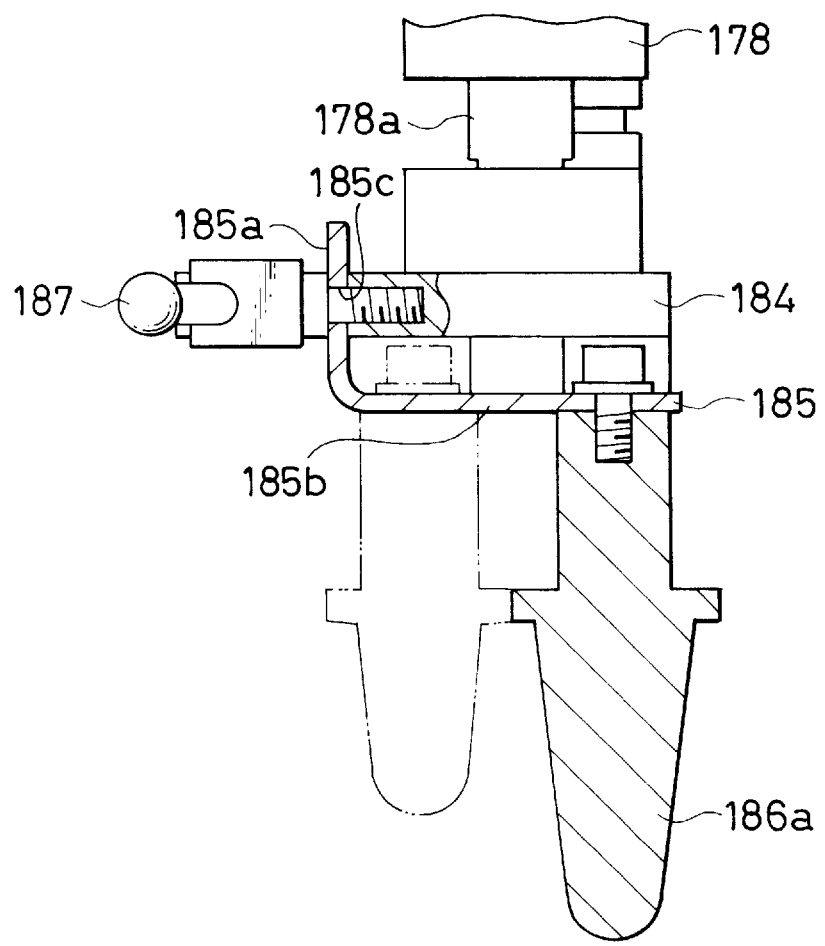
FIG. 33 is an enlarged cross-sectional view of the mounting portion of a holing rod.

On the other hand, the piston rod 178a of the raising and lowering 178 is provided at its leading end with a rod mounting portion 184 on which a rod bracket 185, having a width nearly equal to that of the transplanted seedling trag 15, is mounted. As best shown in FIG. 33, the rod bracket 185 is made from an angle member consisting of a vertical portion 185a and a horizontal portion 185b. Two kinds of brackets, that is, a first bracket (FIG. 33) on which a larger holing rod 186a is mounted, a second bracket (FIG. 32) on which a smaller holing rod 186b is mounted are provided so that the size of the holing can be changed in accordance with the size of the plug seedling G. The rod bracket 185 is mounted on the rod mounting portion 184 by introducing a mounting handle 187 into the opening 185c provided at the vertical portion 185a.

According to the above construction, with the movement of the transplanted seedling carrying means 13, the raising and lowering cylinder 178 is extended and retracted to move the holing rods 186a or 186b vertically, and before the plug seedling G is planted in the transplanted seedling tray 15, the soil contained in the cell of the transplanted seedling tray 15 is holed. Thereafter, the holing device is moved along the cam rail 175 upwardly so as not to interfere with the planting operation during the planting of the plug seedling G to the transplanted seedling tray 15.

According to the present invention, since the seedling transfer mechanism is disposed perpendicular to the plug seedling carrying means and the transplanted seedling carrying means, and empty cups are passed below the base, the transplanter becomes compact, and the transplanting operation can be carried out rapidly.

Further, since two kinds of cups are prepared and the curved portion is provided at the upper end of the arcuate roller guide, it is possible to deal with various size of the plug seedlings.

Furthermore, since the degree of opening of the picking-out claw can be modified, it is possible to grasp the plug seedling reliably in accordance with the size of the plug seedling.

We claim:
1. A transplanter for transplanting a plug seedling grown in a cell of a plug seedling tray containing a plurality of cells to a transplanted seedling tray or a pot, said transplanted seedling tray containing a plurality of cells, said transplanter comprising
   a plug seedling carrying means for carrying the plug seedling tray,
   a transplanted seedling carrying means spaced from the plug seedling carrying means for carrying the transplanted seedling tray or the pot,
   a seedling transfer mechanism disposed across the plug seedling carrying means and the transplanted seedling carrying means for transferring the plug seedling from a position above the plug seedling tray to a position above the transplanted seedling tray or the pot, the seedling transfer mechanism including an endless chain or belt passing above the plug seedling carrying means and the transplanted seedling carrying means and circulating in a plane inclined with respect to a horizontal plane, the endless chain or belt being provided with cupped receptacles on the outer peripheral surface of the endless chain or belt, the cupped receptacles having upwardly directed openings for containing plug seedlings to be spaced a predetermined distance apart, a seedling picking-out mechanism for picking out the plug seedling from the cell of the plug seedling tray and depositing it into one of the cupped receptacles of the seedling transfer mechanism, and a seedling planting mechanism for retrieving the plug seedling from the cupped receptacle and planting it in the transplanted seedling tray or the pot.

2. A transplanter in accordance with claim 1, wherein the endless chain or belt of the seedling transfer mechanism is intermittently moved.

3. A transplanter in accordance with claim 1, wherein the cupped receptacles further comprise two different sizes.

4. A transplanter in accordance with claim 1, wherein at least a portion of the endless chain or belt of the seedling transfer mechanism is passed through a tank for disinfection.

5. A transplanter in accordance with claim 1, wherein the seedling transfer mechanism includes a washing station for cleaning the cupped receptacles.

6. A transplanter in accordance with claim 1, wherein the height of the seedling picking-out mechanism is adjustable to two stages.

7. A transplanter in accordance with claim 6, wherein the seedling picking-out mechanism includes a pair of claw members which are biased closed by a spring, said claw members able to be opened and closed by a claw opening and closing member.

8. A transplanter in accordance with claim 7, wherein the seedling picking-out mechanism includes means for adjusting the degree of the opening and closing of the claw members.

9. A transplanter in accordance with claim 1, wherein the transplanted seedling carrying means includes means for adjusting the height of the transplanted seedling carrying means.

10. A transplanter in accordance with claim 1, further comprising a seedling holding device for preventing the plug seedling from being pulled out by the seedling picking-out mechanism after it deposits the plug seedling into one of the cupped receptacles.

11. A transplanter in accordance with claim 1, wherein the seedling planting mechanism includes at least one planting claw for planting the plug seedling in one of the cells of the transplanted seedling tray or in the pot, said at least one planting claw having four claw members which are opened and closed by pressurized air, said at least one planting claw grasping the plug seedling through four equally spaced slits provided in at least one of the cupped receptacles.

12. A transplanter in accordance with claim 11, further comprising at least one holding device mounted adjacent to the at least one planting claw for holding soil contained in at least one of the cells of the transplanted seedling tray.

13. A transplanter in accordance with claim 1, wherein the endless chain or belt of the seedling transfer mechanism further comprises an upper side portion with respect to the plug seedling carrying means and the transplanted seedling carrying means, said upper side portion for transferring plug seedlings, and a lower side portion for returning the cupped receptacles, the lower side portion lying below the upper side portion.

14. A transplanter in accordance with claim 1, wherein the plug seedling carrying means further includes an upstream side and the transplanted seedling carrying means further includes a downstream side, wherein the plug seedling is picked out at the upstream side of the plug seedling carrying means and planted at the downstream side of the transplanted seedling carrying means.

15. A transplanter in accordance with claim 7, wherein a space between each claw member provided at the seedling picking-out mechanism is adapted to be automatically adjusted.

16. A transplanter in accordance with claim 1, wherein the seedling planting mechanism includes a plurality of planting claws each separated by a space, and the space between each planting claw is adapted to be automatically adjusted.

17. A transplanter in accordance with claim 11, wherein the endless chain or belt of the seedling transfer mechanism circulates in a plane substantially perpendicular to a horizontal plane.

18. A transplanter in accordance with claim 1, wherein the transplanted seedling carrying means is disposed parallel to the plug seedling carrying means and spaced from the plug seedling carrying means, and the seed is disposed perpendicularly to the plug seedling carrying means and the transplanted seedling carrying means.

19. A transplanter for transplanting a plug seedling grown in a cell of a plug seedling tray to a transplanted seedling tray or a pot, said transplanted seedling tray containing a plurality of cells, said transplanter comprising a plug seedling carrying means for carrying the plug seedling tray, a transplanted seedling carrying means spaced from the plug seedling carrying means for carrying the transplanted seedling tray or the pot, a seedling transfer mechanism disposed across the plug seedling carrying means and the transplanted seedling carrying means for transferring the plug seedling from a position above the plug seedling tray to a position above the transplanted seedling tray or the pot, the seedling transfer mechanism including an endless chain or belt passing above the plug seedling carrying means and the transplanted seedling carrying means and circulating in a plane inclined with respect to a horizontal plane, the endless chain or belt being provided with cupped receptacles on the outer peripheral surface of the endless chain or belt, the cupped receptacles having upwardly directed openings for containing plug seedlings to be spaced a predetermined distance apart, and a sensor means for determining whether the plug seedling in a cupped receptacle is of a desired size, a seedling picking-out mechanism for picking out the plug seedling from the cell of the plug seedling tray and depositing it into one of the cupped receptacles of the seedling transfer mechanism, and a seedling planting mechanism for picking out the plug seedling judged by the sensor to have a desired size from the cupped receptacle and planting it in one of the cells of the transplanted seedling tray or the pot.

20. A transplanter in accordance with claim 19, wherein the seedling planting mechanism includes at least one planting claw for planting each plug seedling in the transplanted seedling tray or the pot, each planting claw being independently operable.

* * * * *